United States Patent
Tertoolen et al.

(10) Patent No.: US 10,654,489 B2
(45) Date of Patent: May 19, 2020

(54) VEHICULAR HUMAN MACHINE INTERFACES

(71) Applicant: TomTom International B.V., Amsterdam (NL)

(72) Inventors: Simone Francine Tertoolen, Rotterdam (NL); Hubertus Jacobus Maria Nijssen, Eindhoven (NL); Cornelis Klaas van Dok, Kudelstaart (NL)

(73) Assignee: TOMTOM GLOBAL CONTENT B.V., Amsterdam (NL)

( * ) Notice: Subject to any disclaimer, the term of this patent is extended or adjusted under 35 U.S.C. 154(b) by 112 days.

(21) Appl. No.: 15/320,759

(22) PCT Filed: Jun. 25, 2015

(86) PCT No.: PCT/EP2015/064471
§ 371 (c)(1),
(2) Date: Dec. 21, 2016

(87) PCT Pub. No.: WO2015/197803
PCT Pub. Date: Dec. 30, 2015

(65) Prior Publication Data
US 2018/0273050 A1  Sep. 27, 2018

(30) Foreign Application Priority Data

Jun. 25, 2014 (GB) .................................. 1411309.6
Jun. 3, 2015 (GB) .................................. 1509591.2

(51) Int. Cl.
*B60W 50/14* (2020.01)
*B60K 37/06* (2006.01)
(Continued)

(52) U.S. Cl.
CPC .............. *B60W 50/14* (2013.01); *B60K 35/00* (2013.01); *B60K 37/06* (2013.01); *B60R 1/00* (2013.01);
(Continued)

(58) Field of Classification Search
CPC .............. B60K 37/06; B60K 2350/928; B60K 2350/106; B60K 35/00; B60K 2350/1004;
(Continued)

(56) References Cited

U.S. PATENT DOCUMENTS

2010/0182140 A1  7/2010  Kohno et al.
2010/0288567 A1  11/2010  Bonne
(Continued)

FOREIGN PATENT DOCUMENTS

CN  1521042 A  8/2004
CN  1576087 A  2/2005
(Continued)

OTHER PUBLICATIONS

"Audi Reveals Third-Generation TT's Interior, Next-Gen MMI Infotainment System [2014 CES]" http://blog.caranddriver.com/audi-reveals-third-generation-tts-interior-next-gen-mmi-infotainment-system-2014-ces/ accessed Jun. 26, 2014.
(Continued)

*Primary Examiner* — Leon Viet Q Nguyen

(57) ABSTRACT

A method of operating a controller of a vehicle human machine interface (HMI) is disclosed, comprising: providing first output control signals configured to cause a vehicular head up display (HUD) to present first content to a vehicle operator; and providing second output control signals configured to cause a vehicular digital cluster display (DCD) to present second content to the vehicle operator, different to the first content. The method can further comprise the receiving input control signals from a touch sensitive steer-
(Continued)

ing wheel, for interacting with the information presented on the HUD and/or DUD. A related apparatus, vehicular HMI and computer software, are also disclosed.

17 Claims, 18 Drawing Sheets

(51) Int. Cl.
| | |
|---|---|
| *G06F 3/0482* | (2013.01) |
| *G02B 27/01* | (2006.01) |
| *G08G 1/16* | (2006.01) |
| *G06K 9/00* | (2006.01) |
| *B60R 1/00* | (2006.01) |
| *G06F 3/0488* | (2013.01) |
| *B60K 35/00* | (2006.01) |
| *G06F 3/01* | (2006.01) |
| *G08G 1/0968* | (2006.01) |
| *G08G 1/0962* | (2006.01) |

(52) U.S. Cl.
CPC ......... *G02B 27/01* (2013.01); *G02B 27/0101* (2013.01); *G06F 3/013* (2013.01); *G06F 3/0482* (2013.01); *G06F 3/04883* (2013.01); *G06K 9/00832* (2013.01); *G08G 1/096861* (2013.01); *G08G 1/166* (2013.01); *B60K 2370/11* (2019.05); *B60K 2370/152* (2019.05); *B60K 2370/182* (2019.05); *B60K 2370/782* (2019.05); *B60K 2370/785* (2019.05); *B60R 2300/205* (2013.01); *B60R 2300/70* (2013.01); *B60W 2050/143* (2013.01); *B60W 2050/146* (2013.01); *G02B 2027/014* (2013.01); *G08G 1/0962* (2013.01); *G08G 1/165* (2013.01); *G08G 1/168* (2013.01)

(58) Field of Classification Search
CPC ................ G02B 27/01; G02B 27/0101; G02B 2027/014; G08B 1/166; G08B 1/096861; B60W 50/14; B60W 2050/143; B60W 2050/146; G06F 3/013; G06F 3/0482
See application file for complete search history.

(56) References Cited

U.S. PATENT DOCUMENTS

| | | | | |
|---|---|---|---|---|
| 2011/0292268 | A1* | 12/2011 | Mann | B62D 1/046 348/333.01 |
| 2013/0187770 | A1* | 7/2013 | Moussa | G02B 27/0101 340/425.5 |
| 2013/0293452 | A1* | 11/2013 | Ricci | G02B 27/01 345/156 |
| 2015/0015479 | A1* | 1/2015 | Cho | G06F 3/013 345/156 |

FOREIGN PATENT DOCUMENTS

| | | | | |
|---|---|---|---|---|
| EP | 2497671 | A1 * | 2/2012 | ............. B60K 35/00 |
| EP | 2497671 | A1 | 9/2012 | |
| EP | 2497671 | A1 * | 12/2012 | ............. B60K 35/00 |
| EP | 2497671 | A1 * | 12/2012 | ............. B60K 35/00 |
| EP | 2544072 | A2 | 1/2013 | |
| EP | 2708420 | A1 | 3/2014 | |

OTHER PUBLICATIONS

"HUD (head-Up Display)" https://buy.garmin.com/en-GB/GB/mobile/mobileaccessories/hud-head-up-display-/prod134348.html accessed Jun. 26, 2014.
"Top 5 HUDs in modern cars today" http://www.techradar.com/news/car-tech/top-5-huds-in-modern-cars-today-1092312 Accessed Jun. 26, 2014.
"Eyes on the Road, Hands on the Wheel: Thumb-based Interaction Techniques for Input on Steering Wheels" Gonzalez et al. https://faculty.washington.edu/wobbrock/pubs/gi-07.pdf Accessed Jun. 17, 2014.
"Body Control Systems—Capacitive Touchpad Steering Wheel Control Application" http://www.trw.com/sites/default/files/TRW_steeringwheeltouchpad_en.pdf Accessed Jun. 17, 2014.
"Designing & Rapid PrototyPing a Gesture-Enabled Steering Wheel" Fang et al. http://www.auto-ui.org/12/adjunct-proceedings/w1-05-fang.pdf Accessed Jun. 17, 2014.
"Higher System Integration in the Vehicle Cockpit" http://www.contionline.com/www/pressportal_com_en/themes/press_releases/3_automotive_group/interior/press_releases/pr_2014_02_25_domain_integration_en.html Accessed Feb. 11, 2015.
United Kingdom Search Report for United Kingdom patent application No. 1411309.6 dated Dec. 22, 2014.
Partial International Search Report for International patent application No. PCT/EP2015/064471 dated Nov. 20, 2015.
International Search Report for International patent application No. PCT/EP2015/064471 dated Mar. 22, 2016.

* cited by examiner

One hand gestures

Two hand gestures

Map selection

Crosshair behavior

VEHICULAR HUMAN MACHINE INTERFACES

CROSS-REFERENCES TO RELATED APPLICATIONS

The present application is a National Stage of International Application No. PCT/EP2015/064471, filed on Jun. 25, 2015, and designating the United States, which claims benefit to United Kingdom Patent Application 1411309.6 filed on Jun. 25, 2014 and United Kingdom Patent Application 1509591.2 filed on Jun. 3, 2015. The entire content of these applications is incorporated herein by reference.

FIELD OF THE INVENTION

Embodiments of the present invention relate to methods, apparatus, computer programs and systems relating to vehicular human machine interfaces.

BACKGROUND TO THE INVENTION

FIG. 1 illustrates an example of a typical interior view of a vehicle 2. The vehicle 2 comprises a windshield 3, a steering wheel 4 having steering wheel controls 5, an instrument cluster 6 that has large fixed analog dials for at least speed and tachometer (as referred to as a "telematics cluster") and a centre console 7 for navigation, music, phone, climate control, etc (as referred to as a "centre stack"). The centre console functionality can be controlled by either the vehicle operator (driver) or a passenger via an input control such as a rotary or touchscreen.

The Applicant has recognised that with the ever increasing functionality and capabilities being provided to drivers within their vehicle, the conventional human machine interface (HMI) shown in FIG. 1 has a number of disadvantages. For example, the driver is required to use controls in two separate locations: on the steering wheel and on the centre stack, which often requires the driver to take at least one hand off the steering wheel, and potentially to look away from the road for periods of time. An improved vehicle HMI is therefore desirable.

SUMMARY OF THE INVENTION

According to a first aspect of the invention there is provided a method of operating a controller of a vehicle human machine interface (HMI), comprising:

providing first output control signals configured to cause a vehicular head up display to present first content to a vehicle operator; and providing second output control signals configured to cause a vehicular digital cluster display to present second content to the vehicle operator, different to the first content.

The present invention extends to an apparatus for carrying out a method in accordance with any of the aspects or embodiments of the invention herein described.

Thus, in accordance with a further aspect of the invention there is provided an apparatus comprising:

means for providing first output control signals configured to cause a vehicular head up display to present first content to a vehicle operator; and means for providing second output control signals configured to cause a vehicular digital cluster display to present second content to the vehicle operator, different to the first content.

As will be appreciated by those skilled in the art, this further aspect of the present invention can and preferably does include any one or more or all of the preferred and optional features of the invention described herein in respect of any of the other aspects of the invention, as appropriate. If not explicitly stated, the apparatus of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

Thus, in accordance with another aspect of the invention there is provided an apparatus comprising at least one processor and at least one memory including computer program code, the at least one memory and the computer program code configured to, with the at least one processor, cause the apparatus to at least:

provide first output control signals configured to cause a vehicular head up display to present first content to a vehicle operator; and provide second output control signals configured to cause a vehicular digital cluster display to present second content to the vehicle operator, different to the first content.

In embodiments, the first content, compared to the second content, relates to higher mental workload tasks for the vehicle operator. The first content may be acute content relating to events that may need immediate vehicle operator attention, and wherein the second content is chronic content relating to on-going processes instigated and/or controlled by a vehicle operator. The first content may comprise discontinuous content that is displayed only when a predetermined event occurs and the second content may comprise continuous time-evolving content providing continuous feedback relating to on-going processes instigated and/or controlled by a vehicle operator.

In embodiments, the method may comprise providing first output control signals configured to cause a vehicular head up display to present first content to a vehicle operator, in response to a detection event.

In embodiments, the method may comprise automatically changing at least some first content to second content, thereby moving content from the vehicular head up display to the digital cluster display.

In embodiments, at least a warning portion of the first content may be presented in the vehicular head up display only while a vehicular warning condition is satisfied.

In embodiments, at least a notification portion of the first content may be presented in the vehicular head up display temporarily after a vehicular notification condition is satisfied. The notification portion may be displayed in the vehicular digital cluster display, after temporary display in the vehicular head up display, while the vehicular notification condition is satisfied.

In embodiments, the method may comprise providing output control signals configured to cause on-going presentation of speed information in the digital cluster display and to cause, in response to a detection event, temporary presentation of speed information at the vehicular head up display.

In embodiments, the method may comprise providing output control signals configured to cause on-going presentation of navigation guidance information in the digital cluster display and to cause, in response to a detection event, temporary presentation of navigation guidance information at the vehicular head up display.

In embodiments, the first content may define a vehicle operator navigable menu.

In embodiments, the method may comprise enabling passenger interaction via one or more wireless client devices.

In embodiments, the method may comprise: selecting a priority display from a group of displays including at least a vehicular head up display and a vehicular digital cluster display; processing input control signals from a touch sensitive steering wheel as input control signals associated with the selected priority display; and providing output control signals configured to control the selected priority display to present content to a vehicle operator responsive to the input control signals.

It is considered that the use of input control signals from a touch sensitive steering wheel, in relation to a selected priority display, to provide output control signals to control the presentation of information on the selected priority display may be new and inventive in its own right.

Thus, according to another aspect of the invention there is provided a method of operating a controller of a vehicle human machine interface (HMI), comprising:

selecting a priority display from a plurality of displays including at least a vehicular head up display and a vehicular digital cluster display;

processing input control signals from a touch sensitive steering wheel as input control signals associated with the selected priority display; and providing output control signals configured to control the selected priority display to present content to a vehicle operator responsive to the input control signals.

The present invention extends to an apparatus for carrying out a method in accordance with any of the aspects or embodiments of the invention herein described.

Thus, in accordance with a further aspect of the invention there is provided an apparatus comprising:

means for selecting a priority display from a plurality of displays including at least a vehicular head up display and a vehicular digital cluster display;

means for processing input control signals from a touch sensitive steering wheel as input control signals associated with the selected priority display; and means for providing output control signals configured to control the selected priority display to present content to a vehicle operator responsive to the input control signals.

As will be appreciated by those skilled in the art, this further aspect of the present invention can and preferably does include any one or more or all of the preferred and optional features of the invention described herein in respect of any of the other aspects of the invention, as appropriate. If not explicitly stated, the apparatus of the present invention herein may comprise means for carrying out any step described in relation to the method of the invention in any of its aspects or embodiments, and vice versa.

The present invention is a computer implemented invention, and any of the steps described in relation to any of the aspects or embodiments of the invention may be carried out under the control of a set of one or more processors. The means for carrying out any of the steps described in relation to the system may be a set of one or more processors.

Thus, in accordance with another aspect of the invention there is provided an apparatus comprising at least one processor and at least one memory including computer program code, the at least one memory and the computer program code configured to, with the at least one processor, cause the apparatus to at least:

select a priority display from a plurality of displays including at least a vehicular head up display and a vehicular digital cluster display;

process input control signals from a touch sensitive steering wheel as input control signals associated with the selected priority display; and provide output control signals configured to control the selected priority display to present content to a vehicle operator responsive to the input control signals.

In embodiments, the method may comprise: eye tracking of a vehicle operator; and selecting the priority display in dependence upon the eye tracking of the vehicle operator.

Any of the methods in accordance with the present invention may be implemented at least partially using software, e.g. computer programs. The present invention thus also extends to a computer program comprising computer readable instructions that, when executed by at least one processor of an apparatus, causes the apparatus to perform a method according to any of the aspects or embodiments of the invention.

The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium, such as a ROM chip, CD ROM or disk, or could be a signal such as an electronic signal over wires, an optical signal or a radio signal such as to a satellite or the like.

As will be appreciated, the apparatus of the present invention can include a vehicular head up display and a vehicular digital cluster display, and optionally a touch sensitive steering wheel, so as to form a vehicular human machine interface (HMI). The digital cluster display is preferably in a dashboard in front of vehicle operator's position. The head up display is preferably above the dashboard on a windshield in front of the vehicle operator's position.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

BRIEF DESCRIPTION OF THE FIGURES

Embodiments of the invention will now be described, by way of example only, with reference to the accompanying Figures, in which.

DETAILED DESCRIPTION OF THE FIGURES

Figure 1:
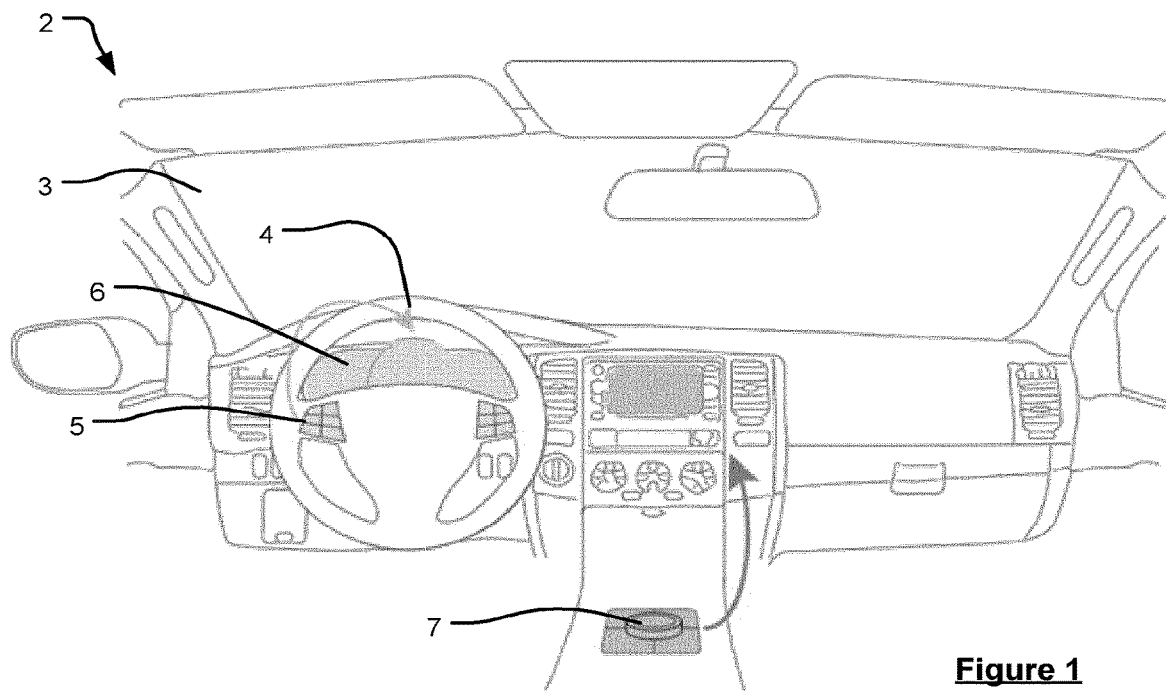
FIG. 1 illustrates an example of an interior view of a vehicle.

Embodiments of the present invention relate to a vehicle human machine interface (HMI) that focuses on safety, by allowing the vehicle operator, i.e. driver, to control functionality, typically restricted to a vehicle centre stack, while keeping their hands on the steering wheel, and while keeping their eyes on the road. The HMI comprises a controller 60, as shown for example in FIG. 3, that is configured to provide first output control signals 61 configured to cause a vehicular head up display (HUD) 30 to present first content 31 to a vehicle operator and to provide second output control signals 62 configured to cause a vehicular digital cluster display (DCD) 20 to present second content 32 to the vehicle operator, different to the first content 31. The controller 60 is capable of controlling what content is displayed on the HUD 30 and when it is displayed, and what content is displayed on the DCD 20 and when it is displayed. The HMI may comprise a touch sensitive steering wheel 10 for use in receiving inputs from the vehicle operator. As will be appreciated, the controller 60 may comprise means for determining if an input at the touch sensitive steering wheel 10 is in respect of the HUD 30 or the DCD 20; this will be described in more detail below.

In embodiments, the controller 60 may be configured to keep the HUD 30 substantially clear of displayed content and only used when necessary for as long as necessary. This prevents the HUD 30 being an unnecessary distraction to a vehicle operator. The controller 60 may, for example, only cause the display of first content 31 in the HUD 30 in response to a detected event such as, for example, a warning event or a notification event. In some examples the HUD 30 may only display first content 31 temporarily in the HUD 30.

Figure 2:
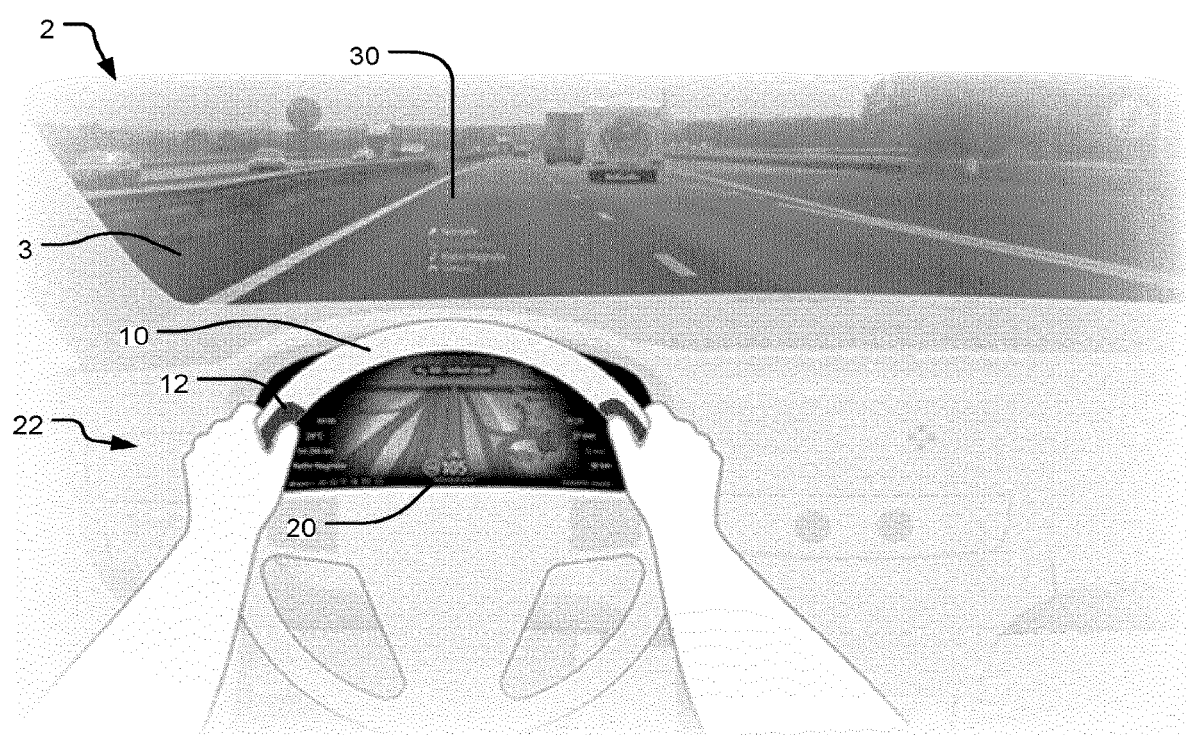
FIG. 2 illustrates an example of an interior view of a vehicle configured to implement an embodiment of the present invention.

FIG. 2 illustrates an example of an interior view of a vehicle 2 configured to implement an embodiment of the present invention. The vehicle 2 comprises a windshield 3, a steering wheel 10 having steering wheel controls 12, a digital cluster display (DCD) 20, and a head up display (HUD) 30. The head up display 30 preferably uses the transparent windshield 3 to reflect projected content to a vehicle operator without requiring the vehicle operator to look away from their usual viewpoint through the windshield 2. The digital cluster display 20 is preferably a pixelated electronic display and the content of the digital cluster display 20 may be controlled by a display driver that addresses the pixels of the electronic display 20. Some examples of pixelated displays include, for example, liquid crystal displays and organic light emitting diode display. Depending upon implementation, a centre console (not illustrated) may or may not be present. The configuration of the human machine interface (HMI) for the vehicle 2 encourages a vehicle operator to keep his or her hands on the steering wheel 10 and to keep watching the road ahead via the windshield 3.

A surface 11 of the steering wheel 10 comprises steering wheel controls 12. In this example, a left steering wheel control 12 is proximate to the vehicle operator's left hand while the operator grips the steering wheel 10 with his or her left hand and a right steering wheel control 12 is proximate to the vehicle operator's right hand while the operator grips the steering wheel 10 with his or her right hand. The steering wheel controls 12 may comprise touch sensitive interfaces, such as for example capacitive touch pads, arranged on an exterior grip portion of the steering wheel 10. The touch sensitive interfaces 12 may be actuated by a vehicle operator while he or she grips the exterior grip portion of the steering wheel 10.

In the embodiment shown in FIG. 2, the touch sensitive interfaces 12 are located on a front part of the exterior grip portion of the steering wheel for use by the driver's thumbs. In other embodiments, the touch sensitive interfaces 12 may be located on a rear part of the exterior grip portion of the steering wheel for use by the driver's fingers, or the touch sensitive interfaces 12, e.g. a pair of capacitive touch pads, may be located on the front of the steering wheel 10.

The digital cluster display 20 is a digital display that is configured to cluster information presented to a user such as speed, tachometer etc. The digital cluster display 20 is located in a dashboard 22 in front of vehicle operator's position and beyond the rear of the steering wheel 10. The head up display 30 is located above the dashboard 22 in front of the vehicle operator's position and beyond the digital cluster display 20. In the illustrated example, the digital cluster display 20 is located directly behind the steering wheel 10 and is at least partially visible through gaps between spokes of the steering wheel 10.

In some, but not necessarily all, embodiments, all Information presented to a vehicle operator is presented in the primary information space of the vehicle operator via the head up display (HUD) 30 and/or the digital cluster display (DCD) 20. In this case, any information presented by the centre console (if present) may be minimal and is intended for passengers. The head up display (HUD) 30 and the digital cluster display (DCD) 20 are located in a primary information space of the vehicle operator.

Figure 3:
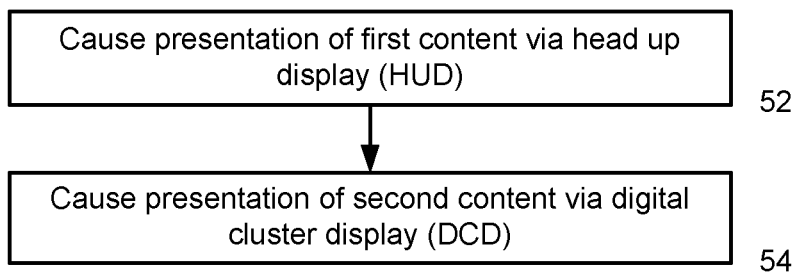
FIG. 3 illustrates an example of a method according to the present invention.
Figure 4:
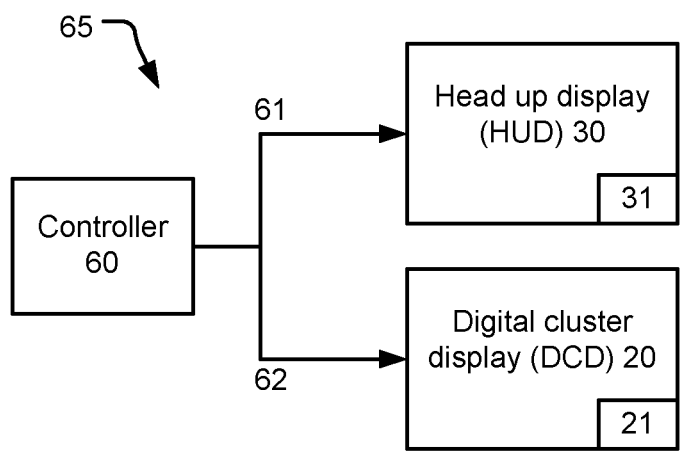
FIG. 4 illustrates an example of a system comprising a controller, a head up display and a digital cluster display.

FIG. 3 illustrates an example of a method 50. The method 50 may be performed by a controller 60 of a system 65, for example, as illustrated in FIG. 4. FIG. 4 illustrates an example of a system 65, for proving a human machine interface, comprising a controller 60 that controls a head up display 30 and a digital cluster display 20. Implementation of the controller 60 may be as controller circuitry. The controller 60 may be implemented in hardware alone, have certain aspects in software including firmware alone or can be a combination of hardware and software (including firmware).

Block 52 of the method 50 comprises, as illustrated in FIG. 4, providing first output control signals 61 configured to cause a vehicular head up display 30 to present first content 31 to a vehicle operator. Next, block 54 of the method 50 comprises, as illustrated in FIG. 4, providing second output control signals 62 configured to cause a vehicular digital cluster display 20 to present second content 21 to the vehicle operator. The first content 31 is different to the second content 21.

In some embodiments, the first content 31, compared to the second content 21, may relate to higher mental workload tasks for the vehicle operator. For example, content that relates to tasks that require more mental resources is presented in HUD 30 rather than the DCD 20. The first content 31 may, for example, comprise one or more "interrupts" relating to events that may need immediate vehicle operator attention.

The first content 31 may be urgent content that requires a vehicle operator's immediate attention. For example, the first content 31 may relate to acute content which should be considered by a vehicle operator within a short time period and without unnecessary delay or latency.

The first content 31 may be important content that requires a vehicle operator's considered attention.

The first content 31 may be transitory content that requires a vehicle operator's prompt attention before it is removed from the HUD 30.

The second content 31 may be foreseeable or expected content because it comprises "on-going content" relating to on-going (or chronic) processes instigated and/or controlled by a vehicle operator and dependent upon a vehicle operator's intentional control of the vehicle.

The first content 31 may comprise discontinuous content that is displayed only when a predetermined event occurs and the second content 21 comprises continuous time-evolving content providing continuous feedback relating to on-going processes instigated and/or controlled by a vehicle operator.

Figure 5:
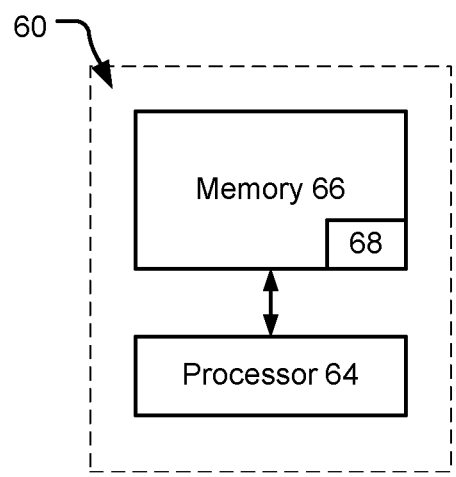
FIG. 5 illustrates an example of a controller comprising at least one processor and at least one memory including computer program code.

FIG. 5 illustrates an example of a controller 60, e.g. as shown in FIG. 4, comprising: at least one processor 64; and at least one memory 66 including computer program code 68 the at least one memory 66 and the computer program code 68 configured to, with the at least one processor 64, cause the controller at least to perform: the method described with reference to FIG. 3 and the methods described elsewhere in this document.

As illustrated in FIG. 5 the controller 60 may be implemented using instructions that enable hardware functionality, for example, by using executable computer program instructions 68 in a general-purpose or special-purpose processor 64 that may be stored on a computer readable storage medium (disk, memory etc) to be executed by such a processor 64.

The processor 64 is configured to read from and write to the memory 66. The processor 64 may also comprise an output interface via which data and/or commands are output by the processor 64 and an input interface via which data and/or commands are input to the processor 64.

The memory 66 stores a computer program 68 comprising computer program instructions (computer program code) that controls the operation of the controller 60 when loaded into the processor 64. The computer program instructions, of the computer program 68, provide the logic and routines that enables the controller 60 to perform the method described with reference to FIG. 3 and the methods described elsewhere in this document. The processor 64 by reading the memory 66 is able to load and execute the computer program 68.

The controller 60 therefore comprises: at least one processor 64; and at least one memory 68 including computer program code 68, the at least one memory 66 and the computer program code 68 configured to, with the at least one processor 64, cause the controller 60 at least to perform: providing first output control signals 61 configured to cause a vehicular head up display 30 to present first content 31 to a vehicle operator; and providing second output control signals 62 configured to cause a vehicular digital cluster display 20 to present second content 21 to the vehicle operator, different to the first content 31.

In some embodiments, the information (and associated tasks) displayed by the HUD 30 and the DCD 20 may be categorized as follows:
1. Warnings, e.g. seat belt warning, collision warning, lane departure warning, engine warning, door open warning, handbrake warning.
2. Notifications, e.g. incoming phone call, incoming messages, faster route available, service reminder, ABS enabled indicator
3. Instructions, e.g. navigation guidance, parking assistant
4. Information, e.g. speed (speed limit, cruise control speed), current status (turn signal, head lights indication, fuel status, time, temperature, connected phone, music, current street name), travel information (ETA, traffic information, travel time, travel distance)

The first content 31 may comprise warnings and/or notifications only and not comprise instructions or information.

Warnings are examples of on-going interrupts relating to unexpected events that may need immediate vehicle operator attention. Such interrupts or warnings may be continuously displayed in the HUD while an interrupt/warning condition, triggered by the unexpected event, is satisfied.

Notifications are examples of temporary interrupts relating to unexpected events that may need immediate vehicle operator attention. Temporary interrupts or notifications may be temporarily presented on the HUD 30 before being transitioned to the DCD 20 for presentation.

Figure 6:
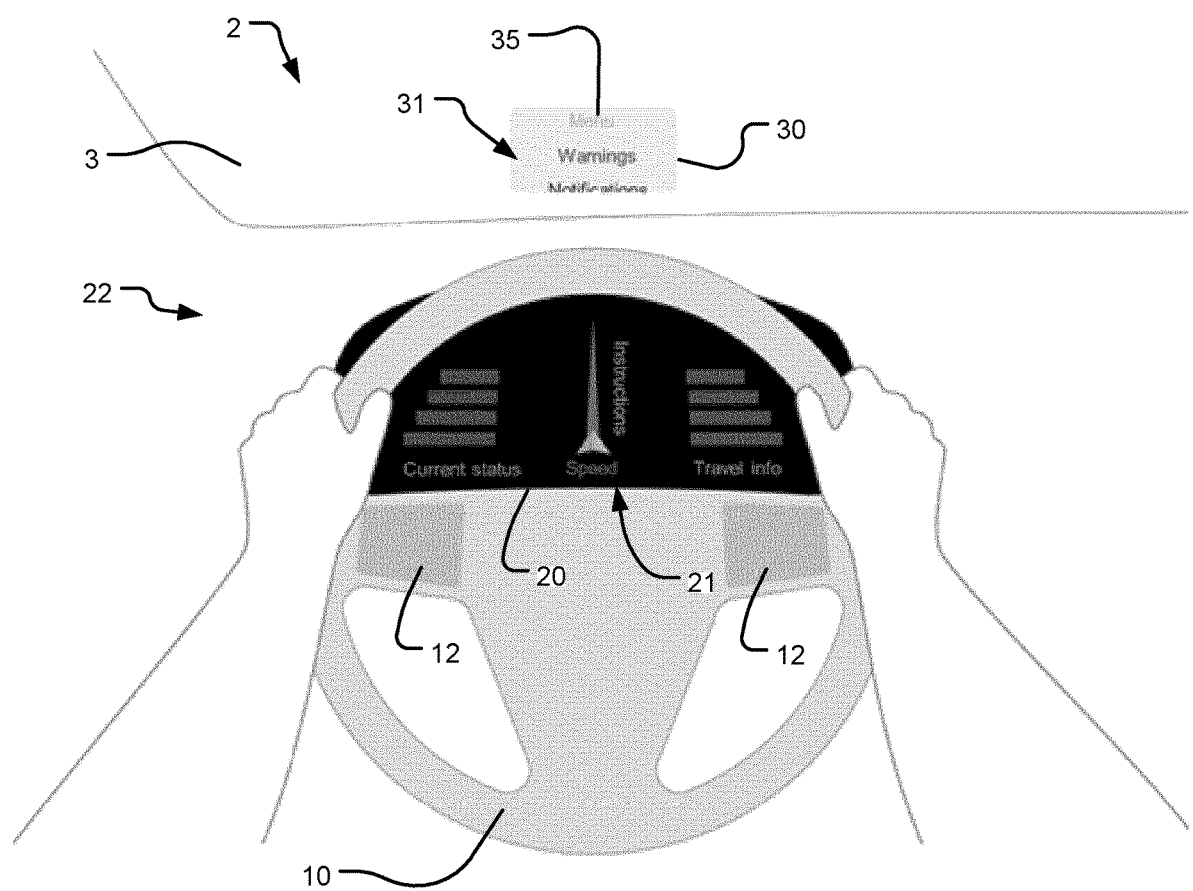
FIG. 6 illustrates an example of a vehicle where the first content is a vehicle operator navigable menu for warnings and notifications.

FIG. 6 illustrates an example of a vehicle 2 where the first content 31 is a vehicle operator navigable menu 35 for warnings and notifications. Other examples of first content 31 include an interface for entering text for a navigation destination, making a phone call, etc. The second content 21 in this example includes current status, speed, navigation or guidance instructions (e.g. to allow a user to follow a predetermined route), travel information.

Figure 7:
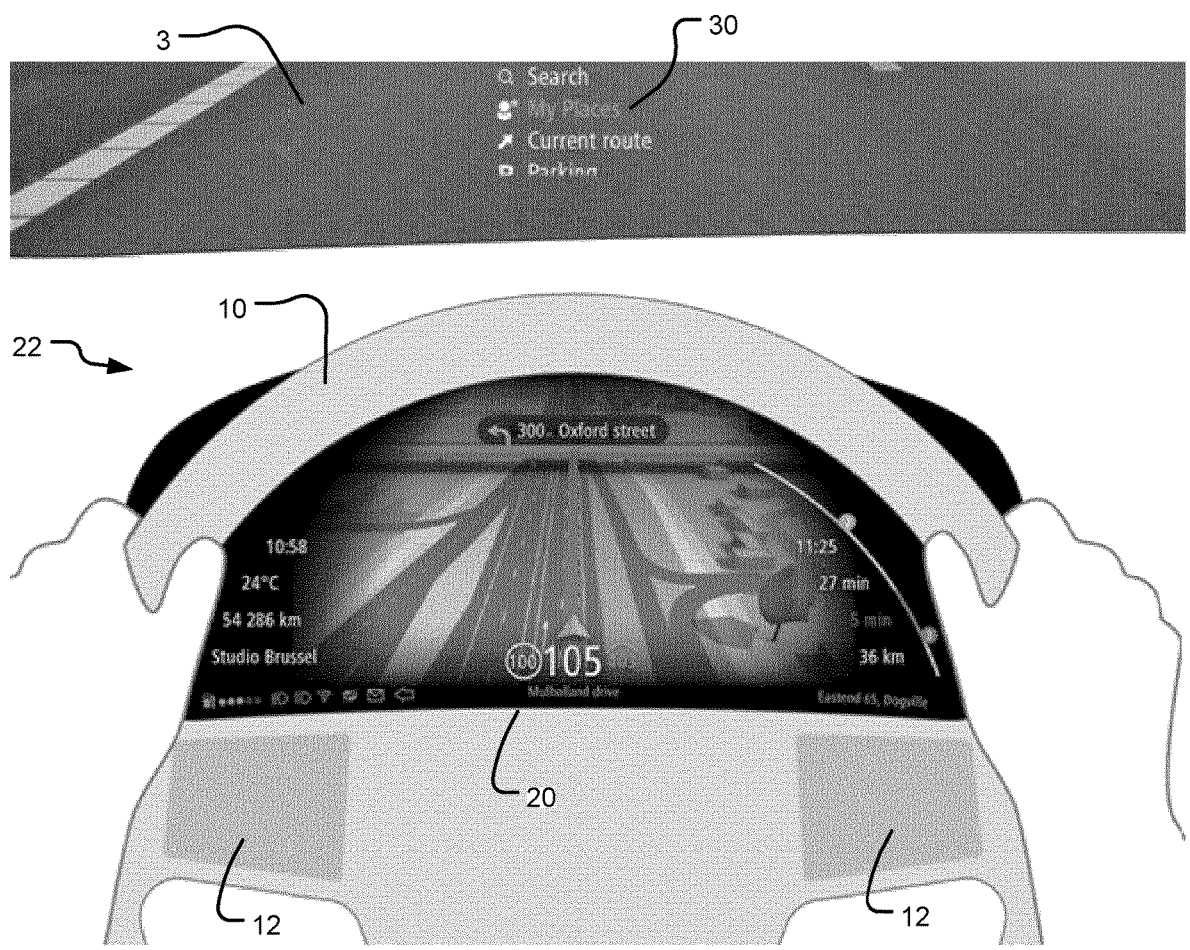
FIG. 7 illustrates an example of a vehicle where the first content is a vehicle operator navigable menu for navigation.

FIG. 7 illustrates an example of a vehicle 2 where the first content 31 is a vehicle operator navigable menu 35 for navigation. The second content 21 in this example includes a map, distance, current status, speed, instructions, travel information.

As shown in FIG. 7, the second content can include a representation of the world, and typically the road network, around the current position of the vehicle, together with graphical icons indicating the current position of the vehicle and a route to be followed. The representation of the world will typically be a computer generated image from a particular point of view (and generated using digital map data representative of the road network).

For example, one common representation is a two-dimensional (2D) view in which an image is generated as though from a camera positioned at an elevated position, and with a pitch angle of 0° so as to show a bird's eye view of the area around the current position of the vehicle. In this view, the camera may move in the x-y plane (i.e. the plane perpendicular to the z-axis and thus parallel to the surface on which the device is moving) so as to track the movements of the device along the route.

Another common representation is a three-dimensional (3D) view in which an image is generated as though from a camera positioned at an elevated position, but which has a pitch angle of 30° for example (a 90° pitch angle being such that the camera is pointed parallel to the plane of the surface) so as to show a perspective view of the area around the current position of the device—this is the representation shown in FIG. 7. In this view, the camera is typically located at a predetermined position behind the current position of the vehicle, i.e. in the x-y plane, based on the direction of travel of the device, so that an icon representative of the current position of the vehicle can be shown in the view. In this view the camera will typically track the movements of the device along the predetermined route; the viewing angle of the camera thus being centred along the direction of travel of the vehicle (or along the path of the predetermined route).

Figure 8:
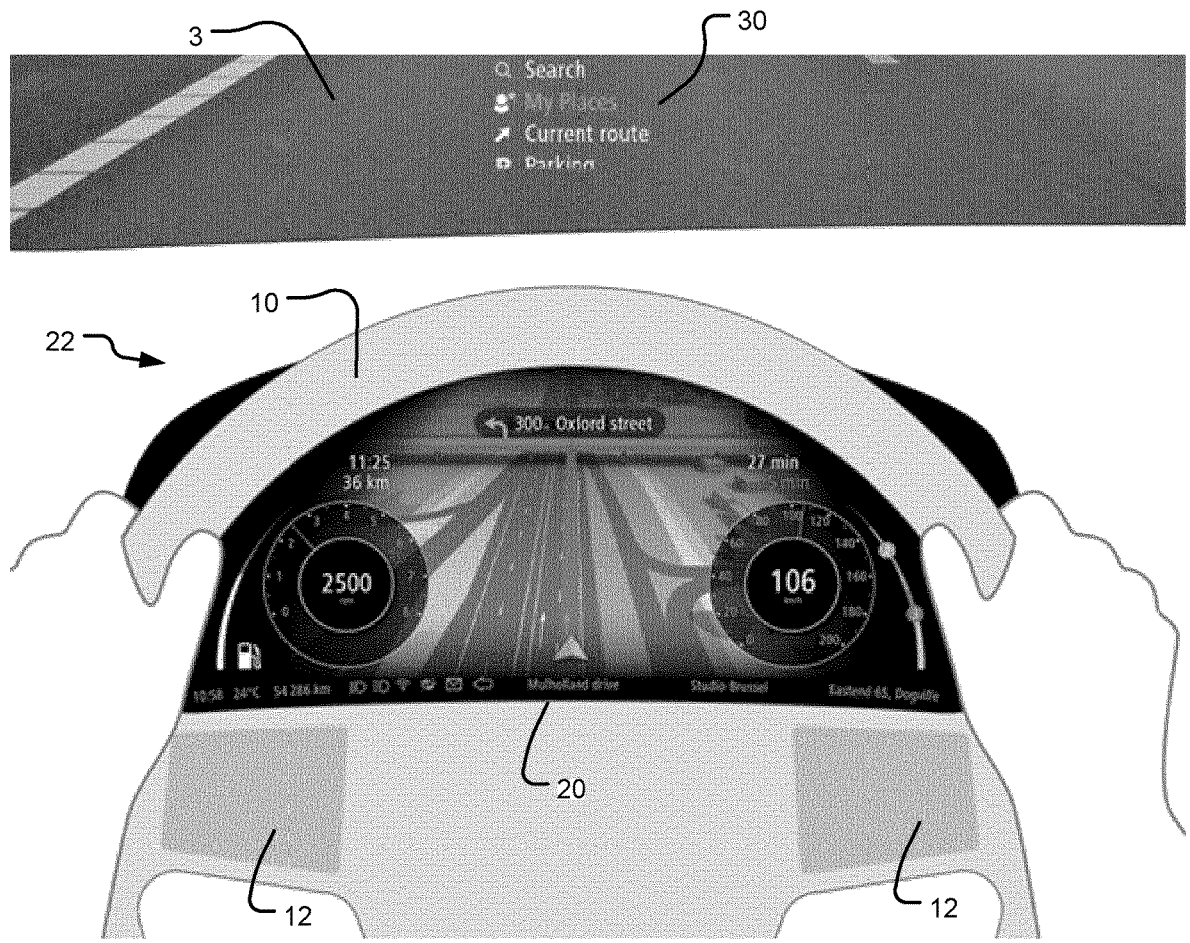
FIG. 8 illustrates an example of a vehicle where the second content is different to the second content of FIG. 7.

FIG. 8 illustrates another example of a vehicle 2, and is similar to the example shown in FIG. 7, but wherein some of the second content, e.g. speed, rpm, is illustrated using dials (to simulate conventional analogue dials).

The operator of the vehicle may select how the second content 21 is presented. For example, the vehicle operator may select from a choice of different styles as illustrated in FIGS. 7 and 8.

Figure 9A:
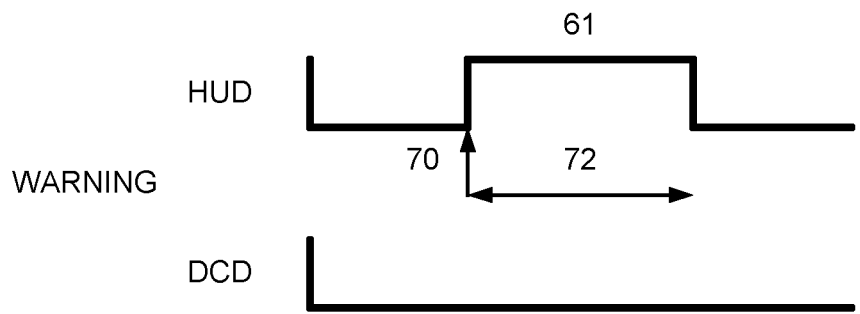
FIG. 9A illustrates an example of first output control signals provided in response to a warning detection event which cause the head up display (HUD) to present first content to a vehicle operator.

FIG. 9A illustrates an example of output control signals provided by the controller 60. The controller 60 provides first output control signals 61 in response to a detection event 70. The first output control signals 61 are configured to cause the head up display (HUD) 30 to present first content 31 to a vehicle operator.

In the illustrated example, the controller 60 provides first output control signals 61 in response to a detection of a system warning event 70. The first output control signals 61 are configured to cause the head up display (HUD) 30 to present a system warning corresponding to the detected system warning event 70 to a vehicle operator.

In the illustrated example, the first output control signals 61 are configured to cause continuous presentation of safety warnings at the vehicular head up display 30 but not at the digital cluster display 20. At least a warning portion of the first content is presented in the vehicular head up display only while a vehicular warning condition 72 is satisfied.

In the illustrated example, but not necessarily all examples, by default warnings are off leaving the HUD 30 clear. When an appropriate event 70 is detected, the warning(s) are on until that event is no longer detected.

Figure 9B:
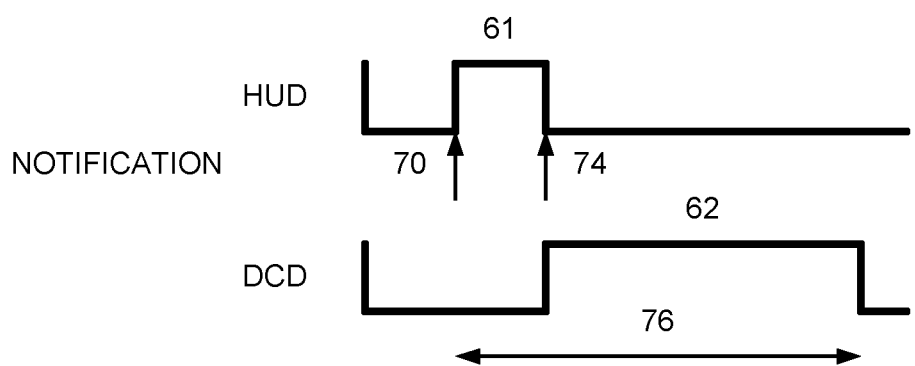
FIG. 9B illustrates an example of first output control signals provided in response to a notification detection event which cause the head up display (HUD) to present first content to a vehicle operator.

FIG. 9B illustrates an example of output control signals provided by the controller 60. The controller 60 provides first output control signals 61 in response to a detection event 70. The first output control signals 61 are configured to cause the head up display (HUD) 30 to present first content 31 to a vehicle operator.

The controller 60 is configured to switch automatically from providing first output control signals 61 to providing second output signals 62. This automatically changes at least some first content 31 to second content 21 thereby moving content from the vehicular head up display 30 to the digital cluster display 20 and at least partially clearing the vehicular head up display 30 of content. The trigger for the switch may, for example, be a timeout period after the detection event 70.

In the illustrated example, the controller 60 provides first output control signals 61 in response to a detection of a system notification event 70. The first output control signals 61 are configured to cause the head up display (HUD) 30 to present a system notification corresponding to the detected notification event to a vehicle operator. The first output control signals 61 are therefore configured to cause temporary notifications at the vehicular head up display 30. The notification is continuously re-displayed in the digital cluster display (DCD), after temporary display in the head up display (HUD), while a vehicular notification condition 76 is satisfied.

In the illustrated example, but not necessarily all examples, by default notifications are off leaving the HUD 30 clear. When an appropriate event 70 is detected, the notification (s) are on in the HUD only temporarily.

Figure 9C:
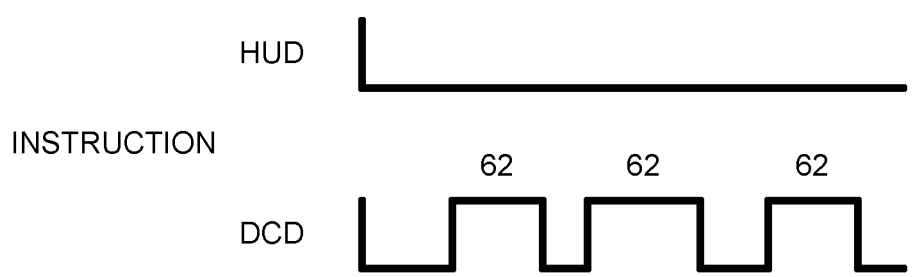
FIG. 9C illustrates an example of second output control signals provided as part of a time-evolving navigation process.

FIG. 9C illustrates an example of output control signals provided by the controller 60. The controller 60 provides second output control signals 62 as part of a time-evolving navigation process. The successive different second output control signals 62 present different navigation content and/or instructions at the DCD 20. Each successive navigation instruction is triggered by execution of the previous navigation instruction.

Figure 9D:
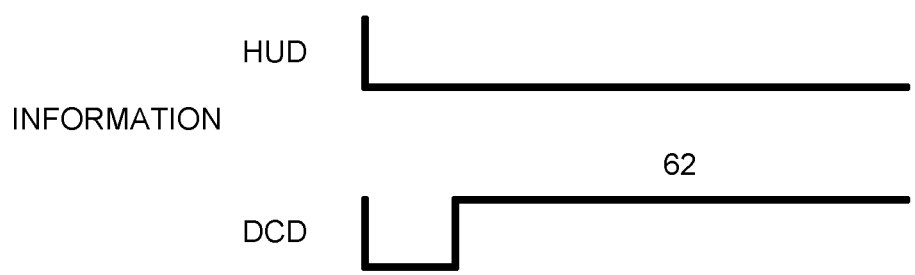
FIG. 9D illustrates an example of second output control signals provided as part of a time-evolving speed monitoring process.

FIG. 9D illustrates an example of output control signals provided by the controller 60. The controller 60 provides second output control signals 62 as part of a time-evolving speed monitoring process. The second output control signals 62 present different speed values at the DCD 20.

Figure 10A:
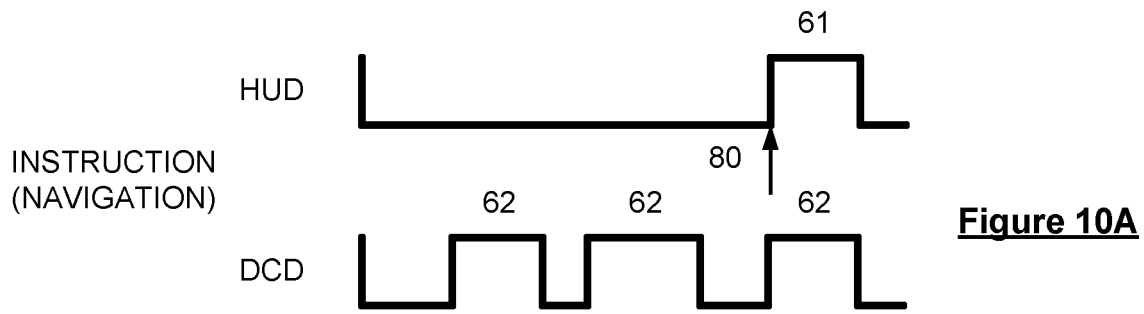
FIG. 10A illustrates an example of second output control signals configured to cause on-going presentation of navigation guidance information in the digital cluster display (DCD) and, in response to a detection event, temporary presentation of navigation guidance information at the vehicular head up display (HUD)

FIG. 10A illustrates an example of output control signals provided by the controller 60. The controller 60 provides second output control signals 62 configured to cause on-going presentation of navigation guidance information in the digital cluster display (DCD). The controller 50 causes, in response to a detection event 80, temporary presentation of navigation guidance information at the vehicular head up display (HUD). The detection event 80 may be, for example, that the next navigation instruction is complex because, for example, there are many alternative options at a junction.

Figure 10B:
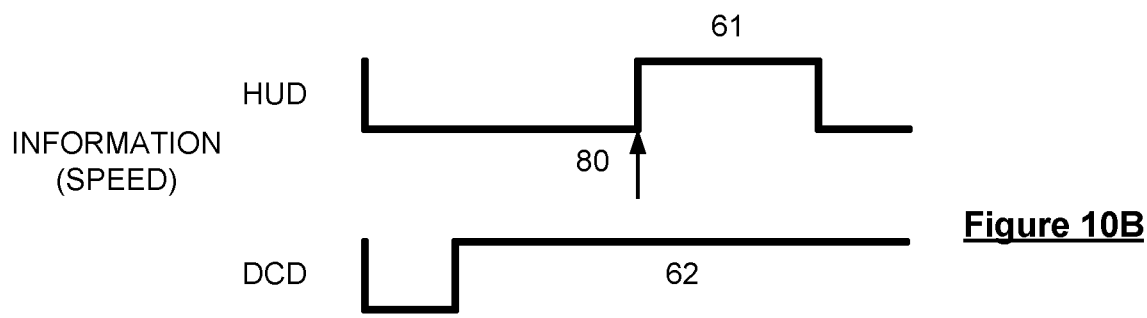
FIG. 10B illustrates an example of second output control signals configured to cause on-going presentation of real-time speed information in the digital cluster display (DCD) and, in response to a detection event, temporary presentation of speed information at the vehicular head up display (HUD)

FIG. 10B illustrates an example of output control signals provided by the controller 60. The controller 60 provides second output control signals 62 configured to cause on-going presentation of real-time speed information in the digital cluster display (DCD). The controller 50 causes, in response to a detection event 80, temporary presentation of speed information at the vehicular head up display (HUD). The detection event 80 may be, for example, that the real-time speed exceeds a local speed limit by a particular margin or because there is a speed limit enforcement device ahead, e.g. a speed camera or speed trap.

Figure 11:
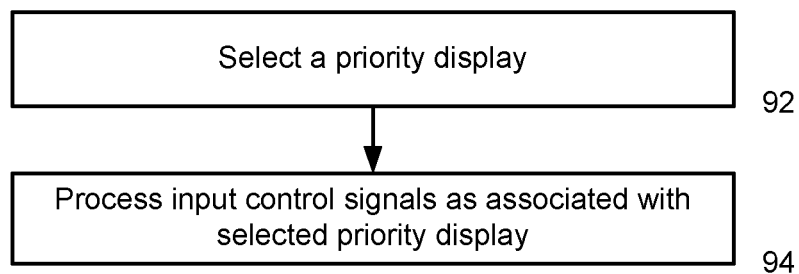
FIG. 11 illustrates a method which may be performed by the controller.
Figure 12:
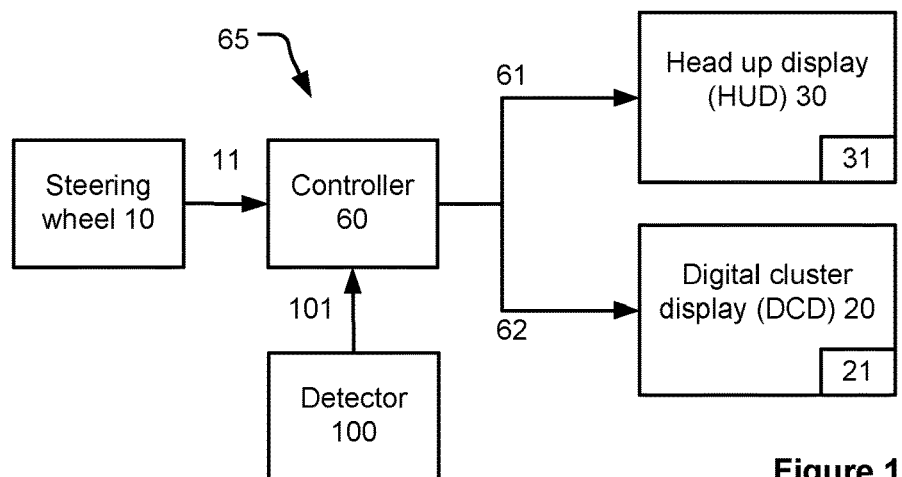
FIG. 12 illustrates an example of a system for performing the method of FIG. 11.

FIG. 11 illustrates a method 90 which may be performed by the controller 60. FIG. 12 illustrates an example of a system 65 for performing the method 90. The system 65 is similar to the system illustrated in FIG. 4 but additionally comprises a steering wheel 10 and a detector 100.

At block 92, the method 90 comprises selecting a priority display from a group of displays comprising a vehicular head up display 30 and a vehicular digital cluster display 20. At block 94, the method 90 comprises processing input control signals 11 from a touch sensitive steering wheel 10 as input control signals associated with the selected priority display. The controller 60 disambiguates the input control signals 11 and determines whether they should be used as first input control signals 61 for the HUD 30 (when the HUD 30 is the priority display) or instead used as second input control signals 62 for the DCD 20 (when the DCD 20 is the priority display).

The controller 60 may receive a disambiguation input 101 to assist with disambiguation. In the illustrated example, but not necessarily all examples, the disambiguation signal 101 is a signal from a detector 100. For example, the detector 100 may perform eye-tracking (gaze detection) for a vehicle operator. The detector 100 can then identify where the vehicle operator was looking when the input control signal 11 was made at the steering wheel 10. If the operator was looking at, or towards, the HUD 30, then it will be selected as the priority display. If the operator was looking at, or towards, the DCD 20, then it will be selected as the priority display.

Referring to FIG. 12, the steering wheel 10 may be used by a vehicle operator to control all or most vehicle features, and particularly those typically associated with vehicle infotainment systems, without taking their hands from the steering wheel 10. Infotainment features include navigation, music, phone, climate control, etc. It will of course be appreciated that some physical buttons, switches or other such controls may potentially be present in the vehicle as well.

In embodiments, the steering wheel 10 may be used to navigate a menu displayed in the HUD 30. As illustrated in FIGS. 6, 7 and 8 the first content 32 may define a menu 35 comprising one or more menu items or graphical icons. User input via the steering wheel 20 may navigate to a menu item or icon, then select a menu entry or icon to perform a function associated with the menu entry or icon. For example, the touch sensitive interfaces 12 of the steering wheel 10 may detect gestures that allow navigation of menu screens 35 displayed on the HUD 30. For example, the touch sensitive interfaces 12 of the steering wheel may be used to select menu items, initiate or accept phone calls, input an address for use as a destination (e.g. through interactive with a virtual keyboard), etc. In some but not necessarily all examples, a cursor may be displayed on the HUD 30, to aid the user in selecting features.

The operator may provide input via the steering wheel using one hand or both hands. For example, different functionality could be assigned to each hand, e.g. switching menu screen/pages using one hand, and exploring the current menu using the other hand.

Figure 13:
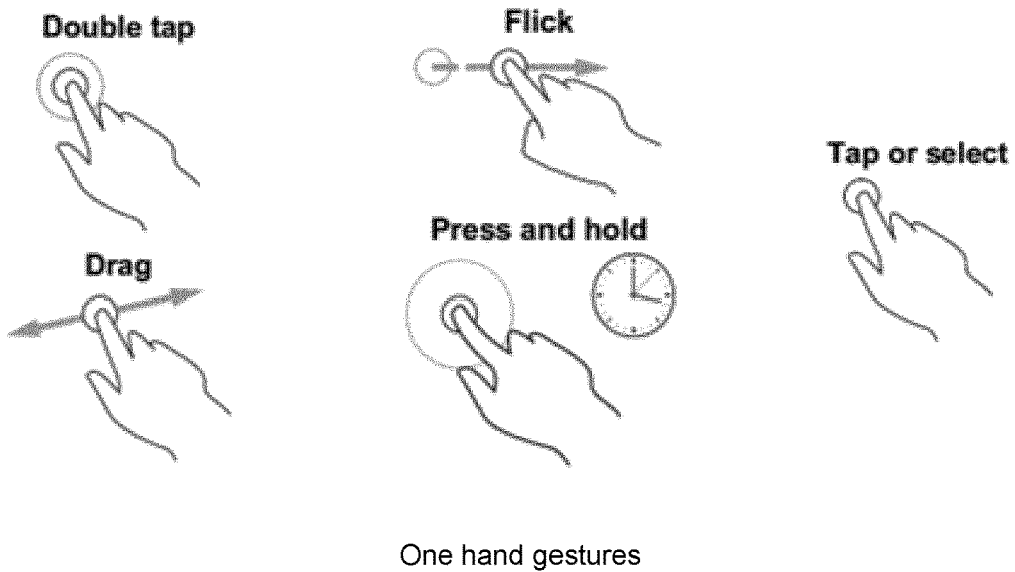
FIGS. 13 and 14 illustrate different input gestures.
Figure 14:
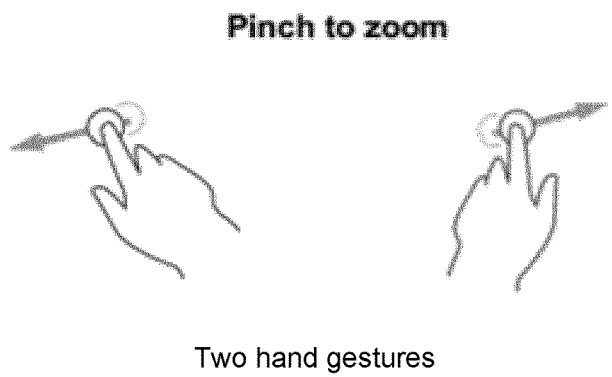

In embodiments, the touch sensitive interfaces 12 of the steering wheel 10 may be used to interact with a representation of a digital map displayed in the DCD 20. For example the representation may be an interactive map that responds and scales to touch. As illustrated in FIG. 13, a vehicle operator can: tap with respect to a position on the map to get an instant route to a destination; double tap with respect to a position on the map to zoom in on the map centered at that position; drag with respect to a map position to scroll the map; flick to scroll a long distance on the map; press and hold with respect to a location to open a pop-up menu, which can be related to a feature on the map at the particular location; and single tap with respect to an item displayed in a menu to select the item in the menu. As illustrated in FIG. 14, a vehicle operator can pinch to zoom to find and explore places on the map. A pinch requires two points of simultaneous contact and a change in the separation between those points. Increasing the separation zooms in and decreasing the separation zooms out. In some example, but not necessarily all examples, the scaling of the map may be dependent upon the separation distance. As will be appreciated, the gestures depicted in FIG. 13 can be made using a single hand, while the gestures depicted in FIG. 14 require two hands.

Figure 15:
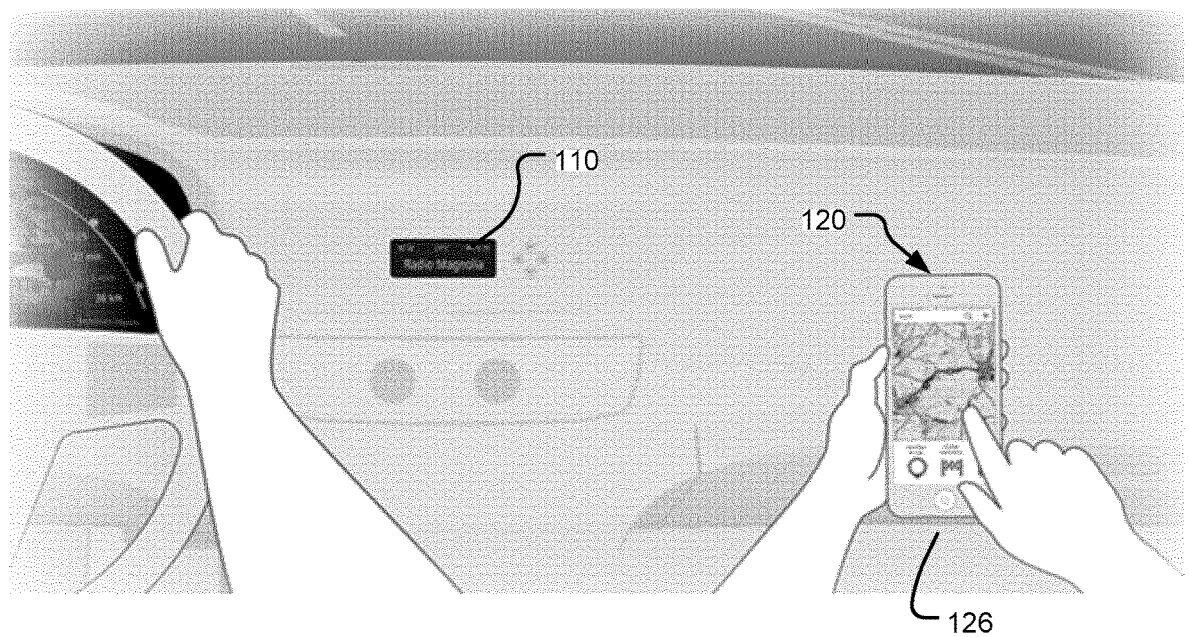
FIG. 15 illustrates an example of a system that uses a client-server architecture.

FIG. 15 illustrates an example of an interior view of a vehicle 2 configured to implement an embodiment of the present invention. It is similar to the system illustrated in FIG. 2 except that it comprises a display 110 in a centre portion (or centre console) of the vehicle, which can be used to display information to a passenger within the vehicle. Although a centre console is present in this example, it has a significantly reduced user input interface. In other words, instead of having a touchscreen, rotary or other such controls, the vehicle includes a client-server architecture, and the passenger uses a client device 120 as an input interface. In the illustrated example, the client device 120 is a personal portable wireless electronic device 126 such as an application enabled mobile cellular telephone or tablet computer or personal digital assistant. Alternatively the client device 120 may be part of the vehicle 2 such as for example, a touchscreen display in the passenger seat, or in the back of the head rest for passengers in the back of the vehicle. The client device 120 may be configured to perform input commands in relation to the infotainment system such as, for example, changing music, destination entry, etc. The client device may communicate directly with a network of the vehicle, or it may send commands via the internet (and a remote server), which then transmits the commands back to the vehicle via the internet.

Figure 16:
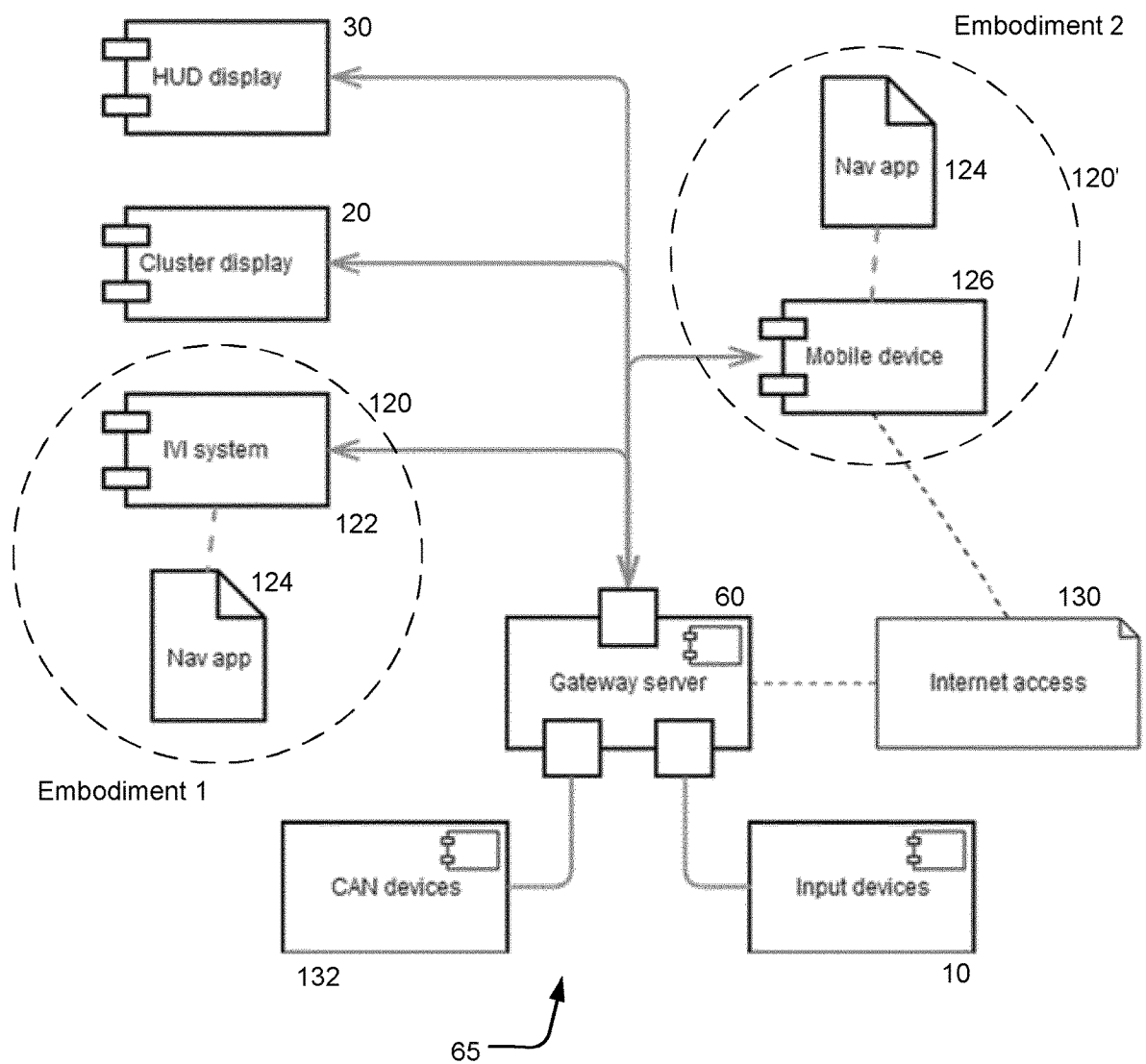
FIG. 16 illustrates a system in which the controller operates as a server for clients.

FIG. 16 illustrates a system 65 similar, although in more detail, to that illustrated in FIG. 4. In this example, the controller 60 operates as a server. In one embodiment—Embodiment 1—the systems comprises a client device 120. The client device 120 is provided by an infotainment processor 122 running a client application 124. The navigation engine of the portable navigation system (optionally including map data) is provided by the infotainment processor 122. In another embodiment—Embodiment 2—the system 65 comprises a undedicated wireless client device 120'. The undedicated client device 120' is provided by a personal computer 126 running the client application 124. The personal computer 126 may be any suitable device such as for example a mobile cellular telephone, personal digital assistant or tablet computer than runs a client application. The navigation engine of the portable navigation system (optionally including map data) may be provided by the personal computer 126 (e.g. owned by the vehicle operator).

The system 65 comprises a gateway sever 60, which can receive vehicle data from devices 132 connected to the vehicle CAN bus (or optionally connected to a vehicle on-board diagnostics (OBD) port), and which can receive input data from input devices 10, such as steering wheel controls 12 and client devices 120, 120'. The server 60 is further connected to range of devices, e.g. to display information such as a status, guidance, map, etc, including HUD 30; digital cluster display 201; and in-vehicle infotainment (IVI) system 122. The server 60 is connectable to the internet, i.e. internet access 130, either directly by use of suitable communication means, and/or indirectly by using suitable means within a client device, e.g. mobile phone 126.

The system 65 therefore enables multiple client devices to connect to the server 60, possibly via the internet or a local wired or wireless network, to facilitate a number of different use cases including: navigation guidance and travel (e.g. traffic) information via the HUD 30 and cluster display 20; destination entry using the HUD 30 and steering wheel controls 12 (or other means such as speech recognition); and passenger-seat navigation, e.g. trip tracking, destination entry, etc.

Figure 17:
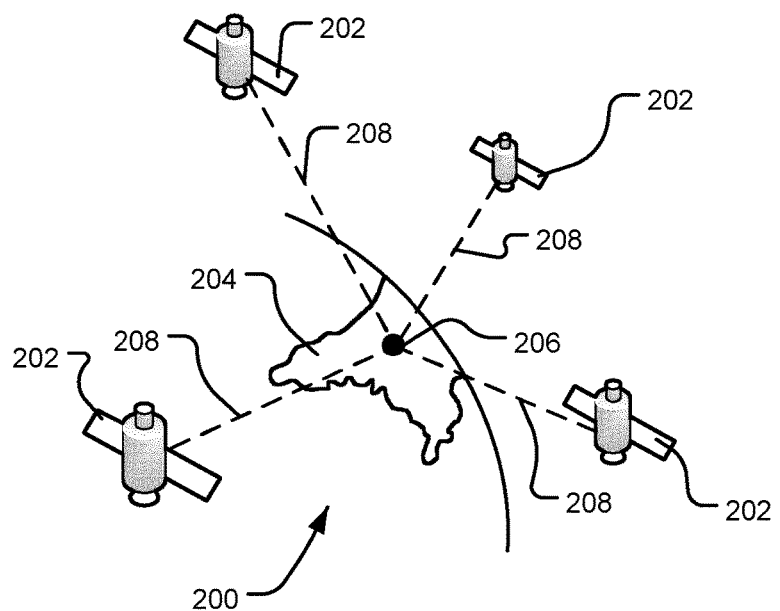
FIG. 17 is a schematic illustration of an exemplary part of a global navigation satellite system (GNSS) usable by a portable navigation system (PNS)

FIG. 17 illustrates a global navigation satellite system (GNSS) 200 usable by a portable navigation system (PNS) 206. The systems 65 previously described may provide or enable a PNS 206. Examples of GNSS include the Global Positioning System (GPS), GLOSNASS, the European Galileo positioning system, COMPASS positioning system or IRNSS (Indian Regional Navigational Satellite System).

The GNSS of FIG. 17 is a satellite-radio based navigation system capable of determining continuous position, velocity, time, and in some instances direction information for an unlimited number of terrestrial portable navigation systems (PNS). The system 200 comprises a plurality of satellites 202 orbiting about the earth 204. A PNS 206 receives GNSS data as spread spectrum GNSS satellite data signals 208 from a number of the plurality of satellites 202.

The PNS 206 measures its distance from those satellites from which it receives a radio signal. The PNS 206 uses the location of at least three satellites 202, known from received ephemeris data, and their calculated distances from the PNS 206 to determine the position of the PNS 206 in two dimensions. Using a fourth satellite position and distance allows the PNS 206 to calculate its three dimensional position. The position and velocity data can be updated in real time on a continuous basis.

The system 65 previously described is an example of a PNS 206. The PNS 206 comprises a processor 64, memory 66 (at least one of volatile and non-volatile, and commonly both), and map data stored within said memory. The processor 64 and memory 66 cooperate to provide an execution environment in which a software operating system may be established, and additionally it is commonplace for one or more additional software programs 68 to be provided to enable the functionality of the PNS to be controlled, and to provide various other functions.

Typically these devices further comprise one or more input interfaces 12 that allow a user to interact with and control the device, and one or more output interfaces 20, 30 by means of which information may be relayed to the user.

A PNS 206 additionally comprises an antenna and dedicated circuitry by means of which satellite-broadcast signals, can be received and efficiently processed to determine a current location of the device.

The PNS 206 may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted.

A PNS 206 is able to determine a route along a navigable network, such as a road network, between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths or other points of interest), and favourite or recently visited destinations. Navigable networks, include for example road networks, pedestrian paths, rivers, canals, cycle paths or the like.

A "best" or "optimum" route is computed between the start and destination address locations from the map data. A "best" or "optimum" route is determined on the basis of predetermined criteria and need not necessarily be the fastest or shortest route. The selection of the route along which to guide a driver can be very sophisticated, and the selected route may take into account historical, existing and/or predicted traffic and road information.

The PNS 206 may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

Although the route calculation and navigation functions are fundamental to the overall utility of PNS 206, it is possible to use the device purely for information display, or "free-driving", in which only map information relevant to the current location is displayed, and in which no route has been calculated and no navigation is currently being performed by the device. Such a mode of operation is often applicable when the user already knows the route along which it is desired to travel and does not require navigation assistance.

During navigation along a calculated route, it is usual for such PNS 206 to provide visual and/or audible instructions to guide the user along a chosen route to the end of that route, i.e. the desired destination. It is also usual for PNS 206 to display and regularly update map information on a screen during the navigation, such as the DCD 20, so that the map information displayed is representative of the current location of the user's vehicle.

The path to be followed by the user may be shown by a line, and the current position of the user is shown by the icon. The number of lanes on at least the current road may be shown through the use of lane dividers. Arrows may show the possible manoeuvres that can be made for each lane at the approaching junction. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route.

The components of a system 65 may be operationally coupled and any number or combination of intervening elements can exist (including no intervening elements). Furthermore, although the memory 66 is illustrated as a single component (or circuitry) it may be implemented as one or more separate components (or circuitry). Similarly, although the processor 64 is illustrated as a single component (or circuitry) it may be implemented as one or more separate components (or circuitry).

Further embodiments of the invention will now be described in relation to FIGS. 18A to 30C.

Figure 18A:
FIG. 18A illustrates an example of an interior view of a vehicle configured to implement another embodiment of the present invention.

FIG. 18A shows an example of an interior view of a vehicle configured to implement an embodiment of the present invention. The system illustrated in FIG. 18A includes a steering wheel 10, a digital cluster display (DCD) or instrument panel 20 and a head up display (HUD) 30. The steering wheel 10 includes an integrated touchpad 12; in this case positioned so as to be controllable by a driver's right hand, although as will be appreciated it can instead be positioned so as to be controllable by a driver's left hand. The steering wheel 10 also includes a plurality of sets of one or more buttons 140 and 141. The system further includes a centre console display device 110, which in this case shows information such as the current destination, i.e. a driver's "home" location, and the estimated time of arrival (ETA) at the home location. The system also optionally includes a plurality of dials 140 that can be used, for example, to control functionality within the vehicle, such as fan speed, temperature, etc.

Figure 18B:
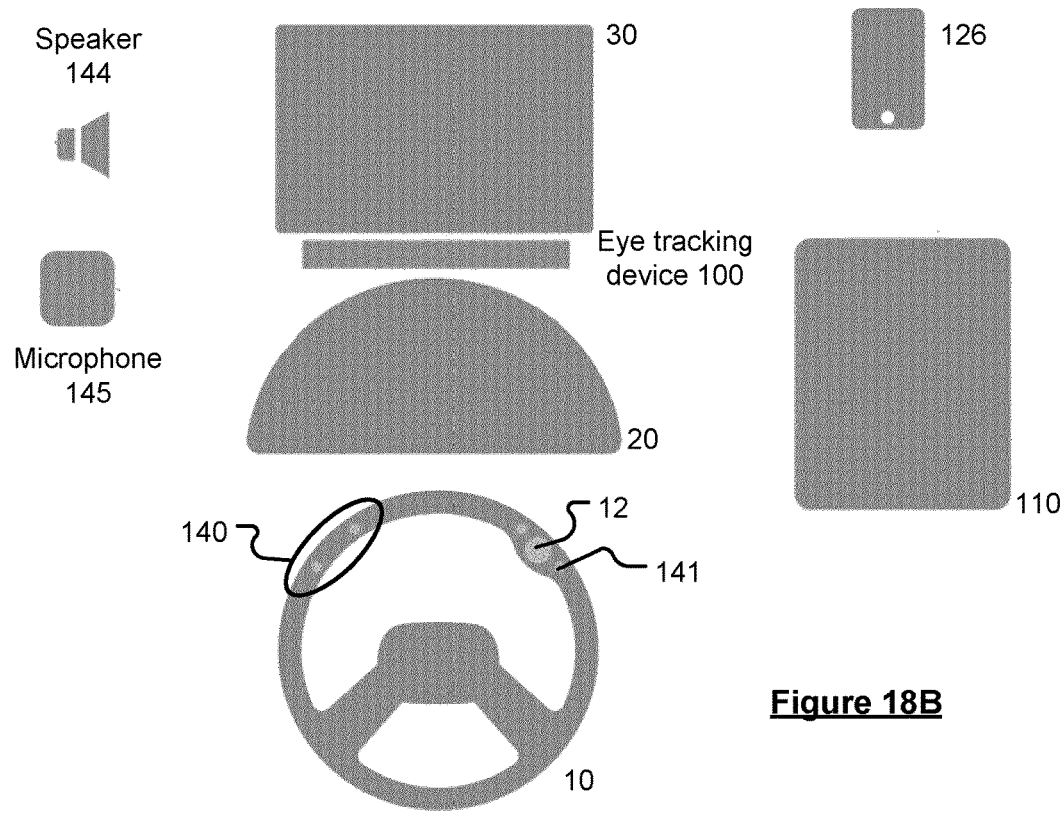
FIG. 18B illustrates the components of the system of FIG. 18A.

FIG. 18B shows a schematic view of the components in the system of FIG. 18A. Therefore, in FIG. 18B, there is shown: a steering wheel 10 with touch pad 12 and buttons 140, 141; a digital cluster display (DCD) 20; and a head up display (HUD) 30. The system also shows: an eye tracking device 100, which can be used to determine whether a driver is looking at the DCD 20 or the HUD 30, and thus used can be used to detect which of the DCD or HUD should have priority; a speaker 144 for the output of audio information, e.g. for navigation instructions, telephone calls, etc; a microphone 145 for receiving audio information from the driver, e.g. instructions that can be interpreted by automated speech recognition (ASR) technology in the vehicle for use in relation to navigation operations, such as destination, route selection, etc, telephone calls, etc. The system also includes a display panel 110 in the centre console of the vehicle and a mobile device 126, which can be used by passengers in the vehicle to control certain functionality, such as navigation operations, music selection, etc.

As discussed above, the HUD 30 is an important part of the system. By default the HUD is empty, thus allowing the driver to concentrate on the road ahead, and displays information only when there is an alert or a notification that should be provided to the driver, e.g. lane departure warnings, speed limit changes, information on incoming telephone calls, previews of incoming messages, etc. The DCD 20 continuously shows vehicle information and map and/or navigation information in a manner that is comprehensible just by glancing at the screen, e.g. in a similar way to conventional gauges and lights in the instrument panel. Information displayed in the DCD 20 and HUD 30 can be controlled from the steering wheel 10, e.g. such that the driver can keep their hands on the steering wheel and their eyes on the road. The integrated touch pad 12 allows the driver, as will be discussed in more detail below, to navigation a menu in the HUD 30, interact with notifications and information, pan and zoom the map displayed in the DCD 20, etc through touch inputs, such as tap, swipe, etc The data that is shown on the HUD 30, i.e. the first content, and which will be referred to herein as "elements", can comprise one or more, and preferably all, of:
WARNINGS: e.g. seat belt warnings, collision warnings, lane departure warnings, engine warnings, handbrake warnings, oil level warnings, airbag off warnings, fuel warnings, door open warnings, etc; in essence elements that relate to internal/external conditions about the vehicle identifying problems that can potentially be hazardous to the driver, passengers, etc within the vehicle
DIRECT NOTIFICATIONS: e.g. incoming phone call, upcoming instructions, faster route available, etc; in essence elements that inform the driver of an action to be taken, but which are only applicable for an immediate time period, and importantly which, if ignored by the driver, would not be hazardous to the people within the vehicle
NOTIFICATIONS: e.g. incoming message, service reminder, etc; in essence elements that inform the driver of an action to be taken, either immediately or at a later time, and importantly which, if ignored by the driver would not be hazardous to the people within the vehicle
INSTRUCTION: e.g. navigation instruction, parking assistance, etc; in essence elements that provide information to the driver about a suggested course of action
MENU ITEMS: e.g. relating to navigation (search for a location, selecting a location from a list of favorites, change route type, browse map, etc), relating to a phone or other communication device (select a contact to call, open a message, write a new message, browse contacts), relating to music (show the current audio track being played, review artists, albums, tracks and playlists of available audio tracks), relating to settings (switch map view in the DCD from two-dimensional (2D) to three-dimensional (3D), reset the vehicle odometer); in essence elements that can be used to control certain functionality within the vehicle
DIRECT CONTROLS: e.g. audio control, volume control, cruise control, ASR, etc; in essence elements that are triggered by the driver depressing, or otherwise activating, one of the buttons on the steering wheel.

In many situations, and because the HUD is desired to be empty unless there is a need to provide data to the driver, only one element will be displayed at any particular time. However, it can be that a certain times, multiple elements may need to be shown to the user. Accordingly, the system preferably uses a priority model to govern which element has priority and should be shown on the HUD and is allowed to interrupt another element.

The priority model used in an embodiment of the system can be as follows:

| ELEMENT | PRIORITY | OVERRULES | INTERRUPTS | PULL BACK |
|---|---|---|---|---|
| Warnings | 1 | Overrules below | Interrupts below | No |
| Direct notifications | 2 | Overrules below | Interrupts below | Yes |
| Direct controls | 3 | Overrules below | Interrupts below | N/A |
| Instructions | 4 | Overrules below | Queues #5 and interrupts #6 | Yes |
| Notifications | 5 | Overrules below | Interrupts #6 | Yes |
| Menu items | 6 | N/A | N/A | Yes |

The term "overrules" means that a first element is displayed in the HUD in favour of a second element. The term "interrupts" means that, if a first element is being displayed, then the second element is displayed in the HUD instead of the first element. The term "pull back", as will be discussed in more detail below, means that the driver can, e.g. through a suitable action on the touch pad 12, cause the displayed element to be removed from the HUD and/or be replaced by an element that was previously displayed before being interrupted.

Example 1

The driver is working in the menu. A warning comes up. This warning overrules the menu and pushes the menu out of the display window used by the HUD. No pull back is allowed, since the warning has the highest priority.

Example 2

The driver is working in the menu. A navigation instruction comes up and interrupts the menu. The user pulls back the menu and the navigation instruction disappears.

Example 3

A navigation instruction is active. A new message comes in. The incoming message is queued and appears after the navigation instruction has finished and disappeared.

Figure 19:
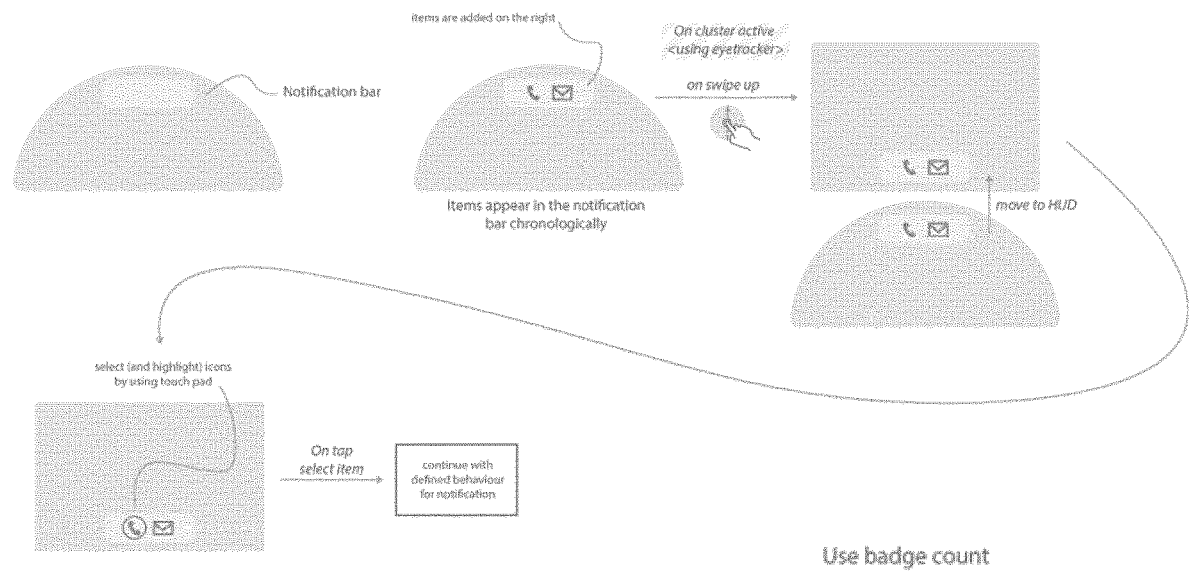
FIG. 19 shows an exemplary process for moving a notification bar from the digital cluster display (DCD) to the head up display (HUD)

In embodiments, notifications (both normal and direct) that are ignored or dismissed by the driver, i.e. pulled back, e.g. by a swipe down touch action on the steering wheel touch pad, will appear in a notification bar that is shown in the DCD. Such notifications can include, for example, incoming messages that were dismissed without being read and incoming phone calls that were dismissed or missed. The notification bar can include a plurality of graphical icons, e.g. one for dismissed phone calls and one for dismissed messages. Each graphical icon can also include a numerical counter indicating a number of such notifications that have been dismissed. FIG. 19 shows an exemplary process for moving a notification bar from the digital cluster display (DCD) to the head up display (HUD). The notification bar can be positioned in any suitable location on the DCD, but in FIG. 19 is shown at the top of the display. The driver can preferably move the notification from the DCD to the HUD, when the DCD is active, e.g. by a detector, such as an eye tracking device, identifying that the DCD has priority over the HUD. Preferably, the driver moves the notification bar by a swipe up touch action on the steering wheel touch pad. Once the notification bar is displayed in the HUD, and the HUD is active, e.g. by the detector identifying that the HUD has priority over the DCD, then the driver can navigate the notification and select a dismissed notification using the steering wheel touch pad (discussed in more detail in FIG. 24). Preferably, after a notification has been selected, then it doesn't reappear in the notification bar. As will be appreciated, the driver can move the notification bar back from the HUD to the DCD using a suitable user input, such as a swipe down touch action.

Figure 20:
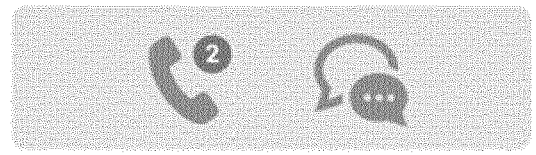
FIG. 20 shows an example of a notification interrupting a menu being displayed on the heads up display (HUD)
Figure 20:

As discussed above, when an element is active (or being displayed) in the HUD, and an element with a higher priority is received by the system, such as a warning or notification, then the current element interrupted and is removed from the HUD, FIG. 20 shows an example of a notification interrupting a menu being displayed on the heads up display (HUD). In the example shown in FIG. 20, the driver is navigating the menu in the HUD when a message arrives. The menu is interrupted and moved out of the display window on the HUD, until the interrupt is complete, e.g. by the driver dismissing the message, either before or after reading it, or by the driver ignoring the notification for a predetermined time, such as 2 or 3 seconds. Once the interrupt is complete, then the original element is preferably again displayed in the HUD.

Figure 21:
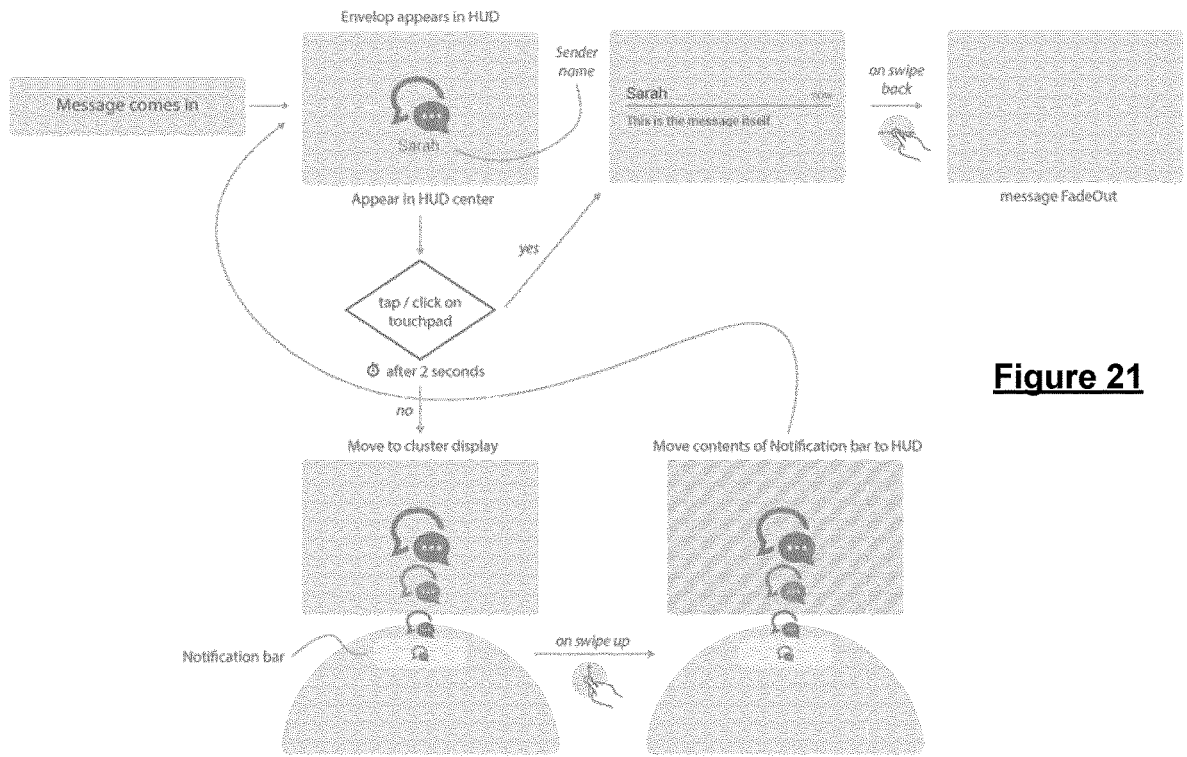
FIG. 21 shows an example of an indication displayed on the heads up display (HUD) when a message is received.
Figure 22:
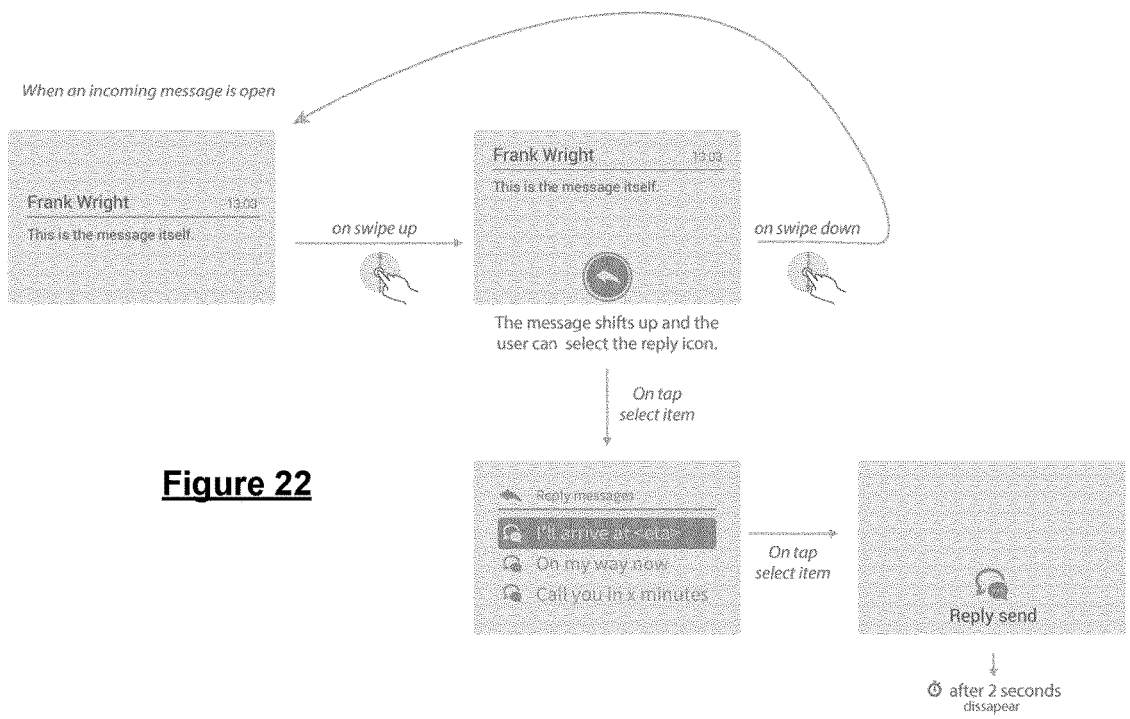
FIG. 22 shows an exemplary process for replying to a received message.

FIG. 21 shows an example of a notification being displayed in the HUD, such as a received message, when the HUD is empty. In the example, shown in FIG. 21, an icon indicative of the notification is displayed in the HUD, whereupon it can be selected and, in the case of a message, read by the user, e.g. though a suitable user input, such as a tap, on the touch pad of the steering wheel. Alternatively, the notification can be dismissed or ignored by the driver, such that the notification moves from the HUD to the notification bar shown in the DCD. If the driver should open the message, the driver can select one or more predefined responses, such as "I'll arrive at . . . " (ETA can be determined from the navigation system), "On my way now" and "Call you in . . . minutes", e.g. again using the steering wheel touch pad, and cause one of these responses to be sent to the sender of the message. This is shown in FIG. 22.

Figure 23:
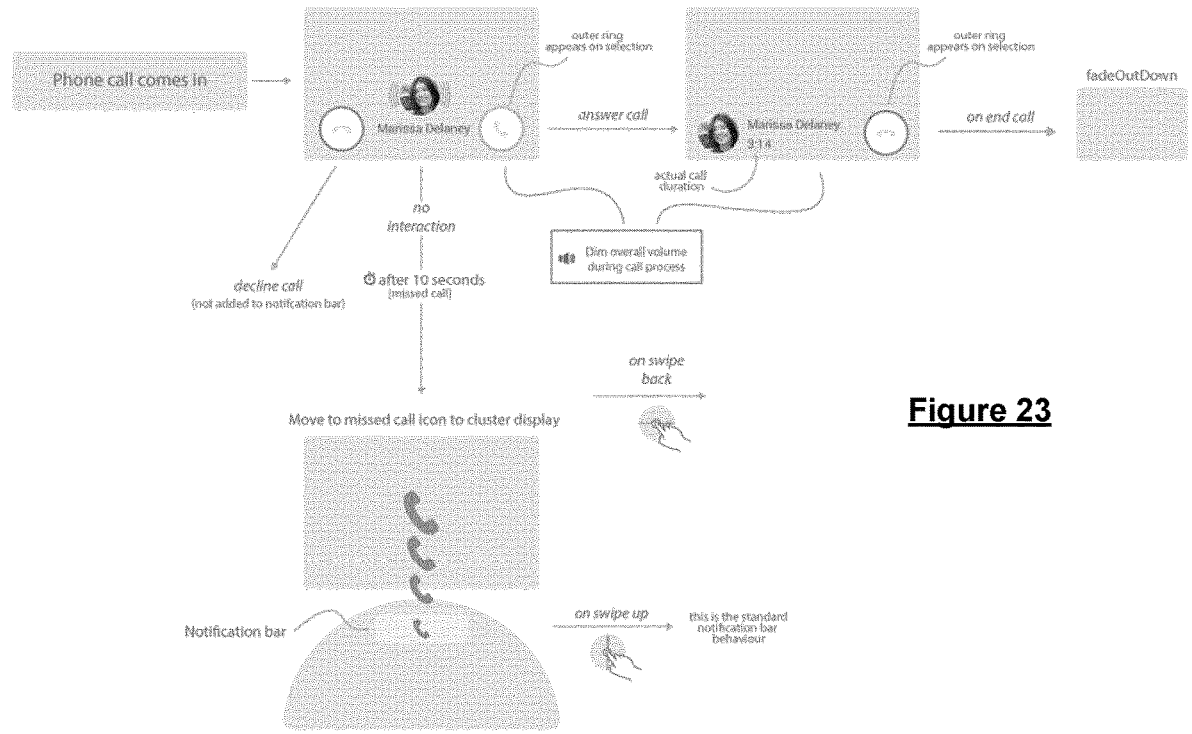
FIG. 23 shows an exemplary process for responding to an incoming telephone call.
Figure 24:
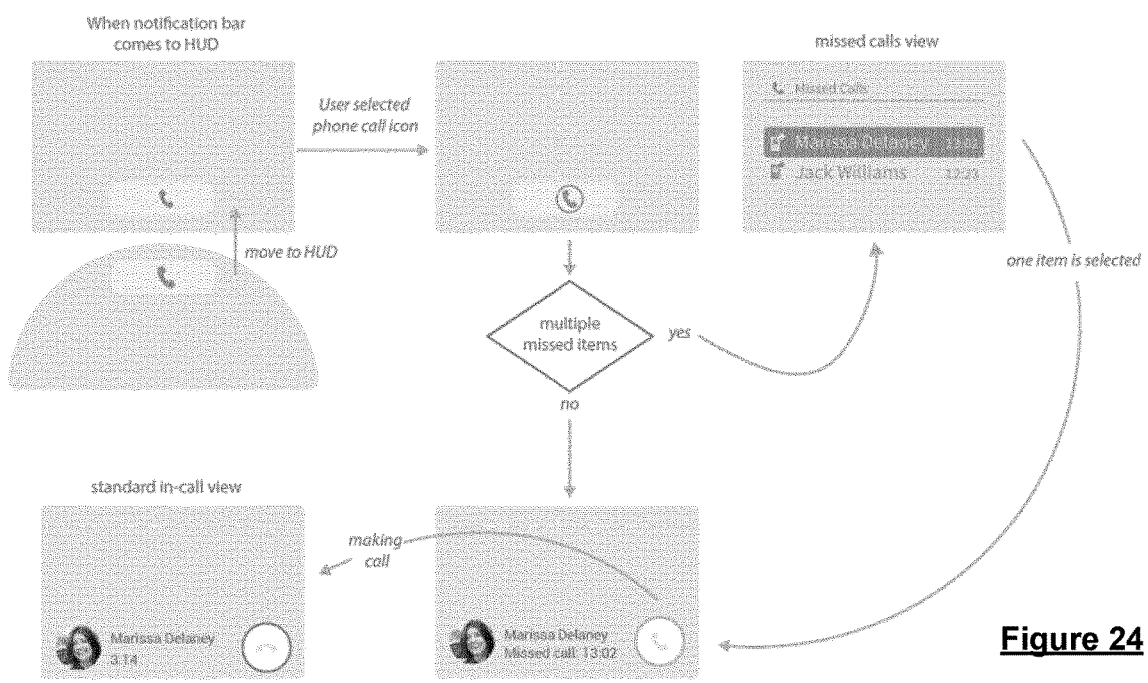
FIG. 24 shows an exemplary process for placing a telephone call.

FIG. 23 shows another example of a notification being displayed in the HUD when the HUD is empty, in this case a received telephone call. The call is handled in a similar way to the message of FIG. 21, and thus if the call is dismissed or ignored then the notification is added to the notification bar in the DCD. FIG. 24 shows an exemplary process for placing a telephone call from the notification bar, e.g. by moving the notification bar from the DCD to the HUD and selecting the relevant notification from the notification bar using suitable user inputs, e.g. touch actions on the touch pad of the steering wheel.

Figure 25:
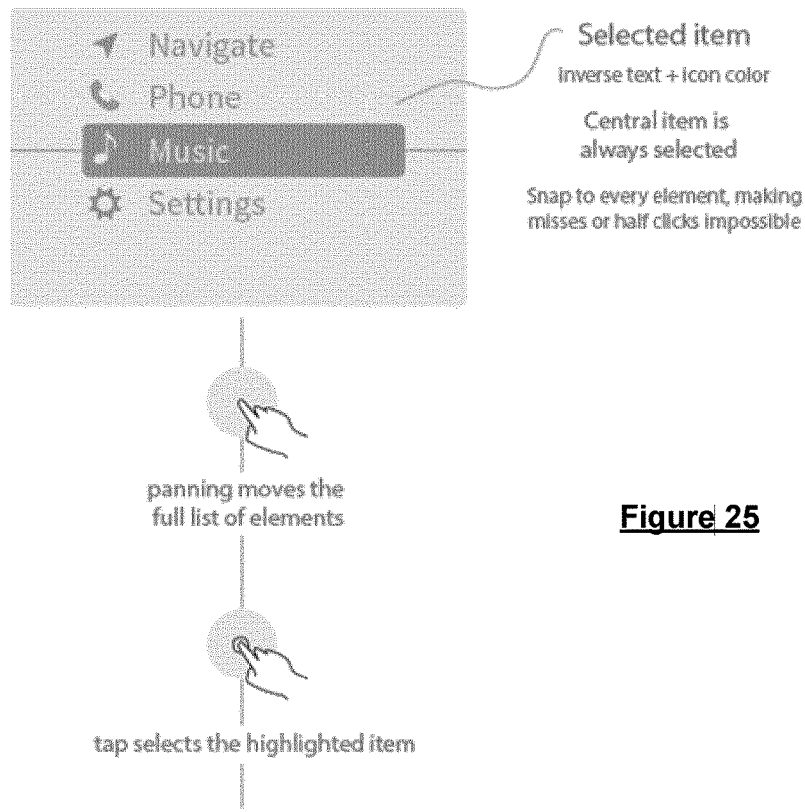
FIG. 25 shows a first exemplary process for interacting with a menu displayed on the heads up display (HUD)
Figure 26:
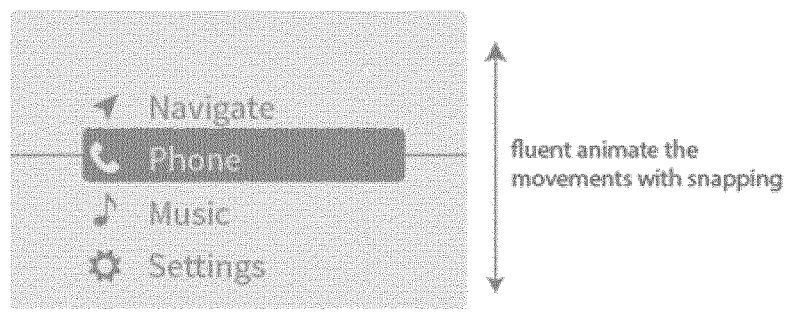
FIG. 26 shows a second exemplary process for interacting with a menu displayed on the heads up display (HUD)
Figure 26:
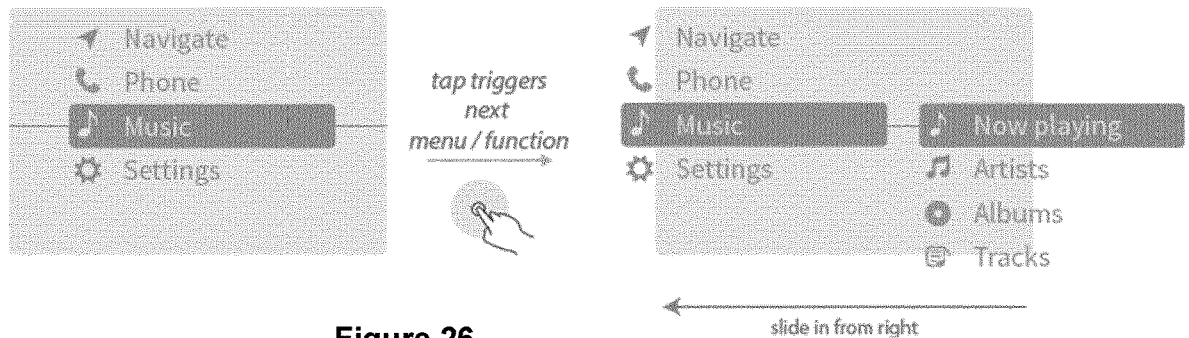

FIGS. 25 and 26 show exemplary methods for interacting with a menu displayed on the HUD. Preferably the methods are associated with a touch actions by the driver on a touch pad, e.g. to navigate the menu and select items from the menu, but it will be appreciated that the methods are also applicable to other user input means, such as a buttons. Preferably, the items in the menu are scrolled, e.g. by the driver swiping up or down on the touch pad, relative to a selector, which preferably has a fixed location, e.g. in the centre of the display window used by the HUD. This means that driver only needs to focus on the fixed selector, rather than at the moving menu items. The menu items are preferably also designed to snap into position during scrolling, such that only a single menu item is present in the selector. Once the desired menu item is in the selector, then the driver can select the item, e.g. by tapping the touch pad. This selection can cause the desired function to activate or deactivate, or for the a new set of menu items (e.g. at a different layer in the menu hierarchy) to be displayed as shown in FIG. 26.

Figure 27:
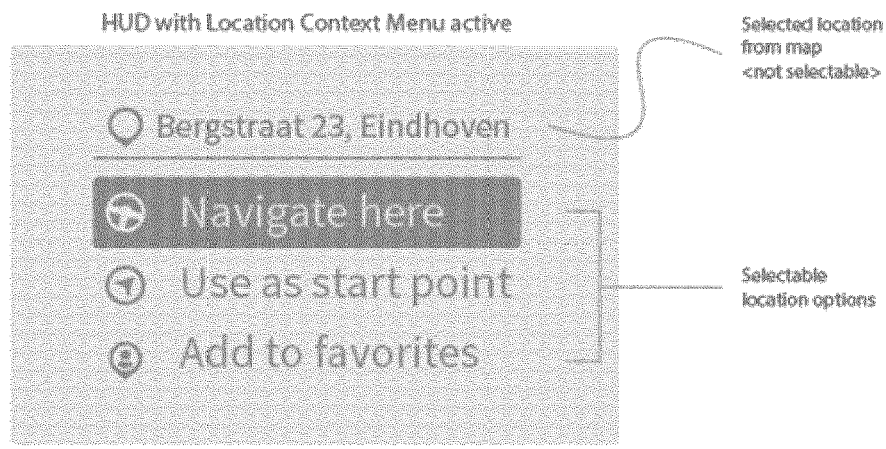
FIG. 27 shows an exemplary process for interacting with a map displayed on the digital cluster display (DCD)
Figure 27:
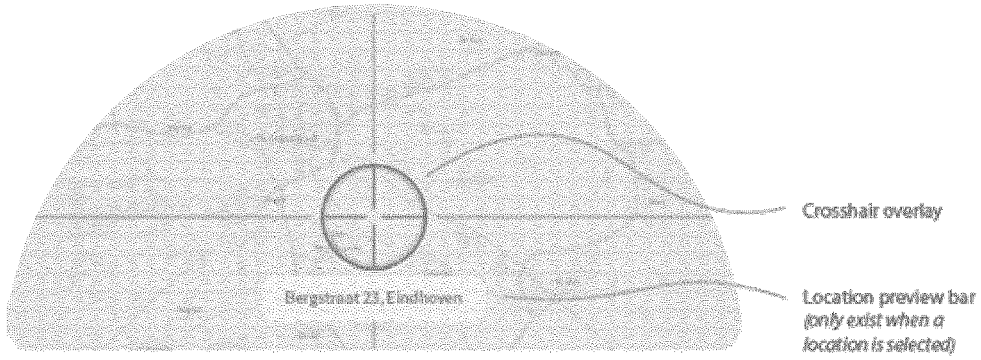
Figure 27:
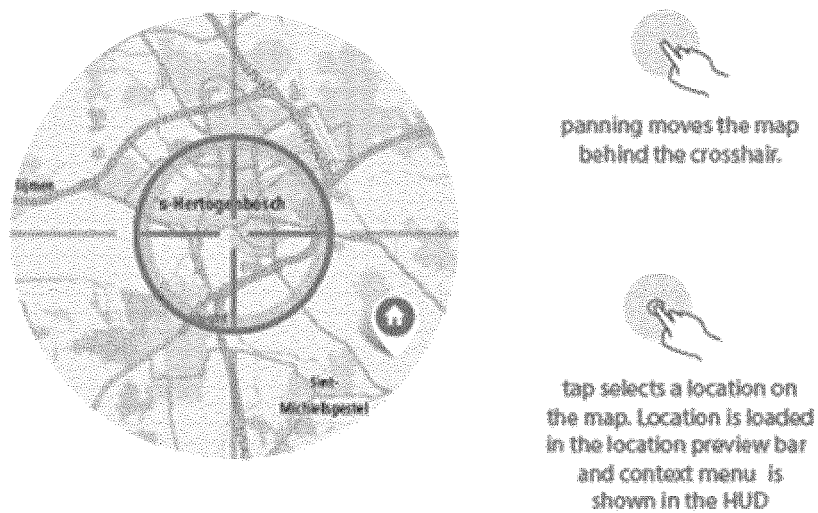

FIG. 27 shows an exemplary process for interacting with a map displayed on the DCD. Preferably the methods are associated with a touch actions by the driver on a touch pad, e.g. to scroll a displayed map, but it will be appreciated that the methods are also applicable to other user input means, such as a buttons. In a similar way to interacting with a menu on the HUD, the map is preferably scrolled, e.g. through suitable movements by the driver on the touch pad, relative to a selector (or crosshair), which preferably has a fixed location, e.g. in the centre of the display window used by the HUD. This means that driver only needs to focus on the fixed selector (or crosshair), rather than at the moving map. Once the desired location is in the selector, then the driver can select the location, e.g. by tapping the touch pad. A preview of the location, e.g. information associated with the location, such as the address, POI name, etc, can then be displayed in the HUD. Additionally, or alternatively, a set of selectable menu items can be displayed in the HUD that allow, for example, the location to be set as a destination to which a route is to be planned from a predefined origin or current location of the vehicle, to be set as the origin for the route, or to be added as a favourite location. The driver can interact with these menu items in the manner discussed in relation to FIG. 26. In embodiments, the map, when being scrolled, could be arranged to snap predetermined locations, e.g. favourites such as a home, work, etc, into the selector, thereby improving the ease of selecting such locations.

Figure 28:
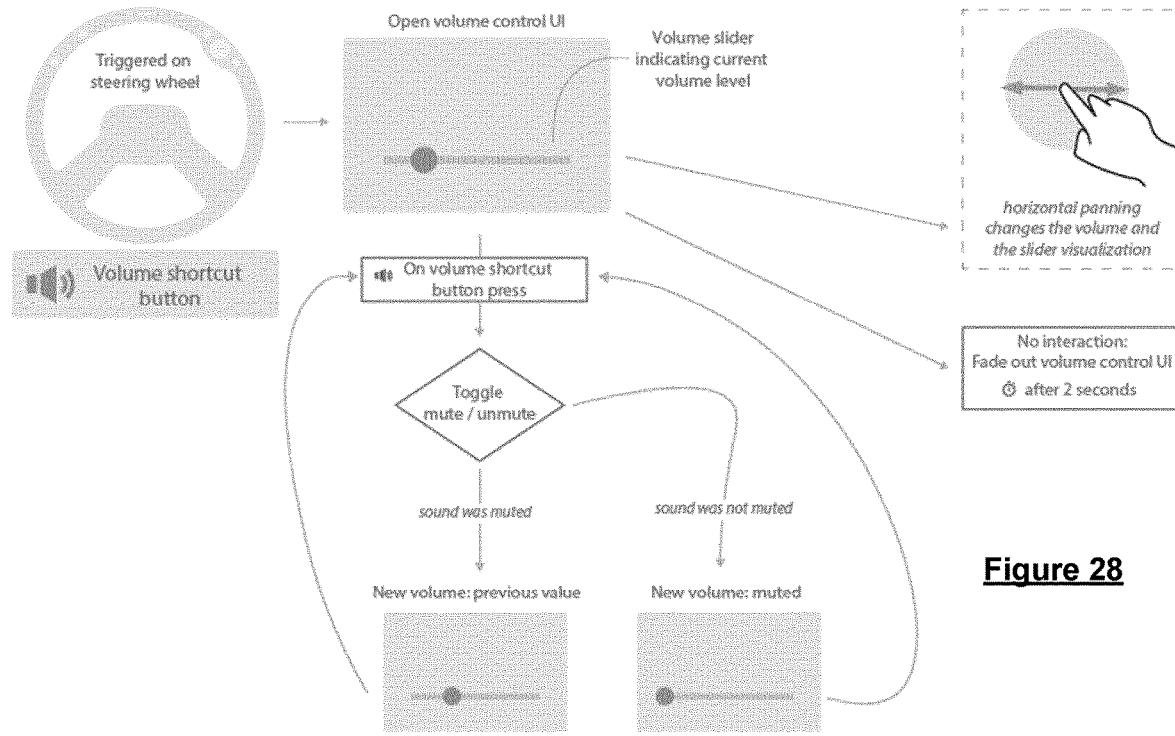
FIG. 28 shows an exemplary process for controlling the volume of audio output from one or more speakers within the vehicle.
Figure 29:
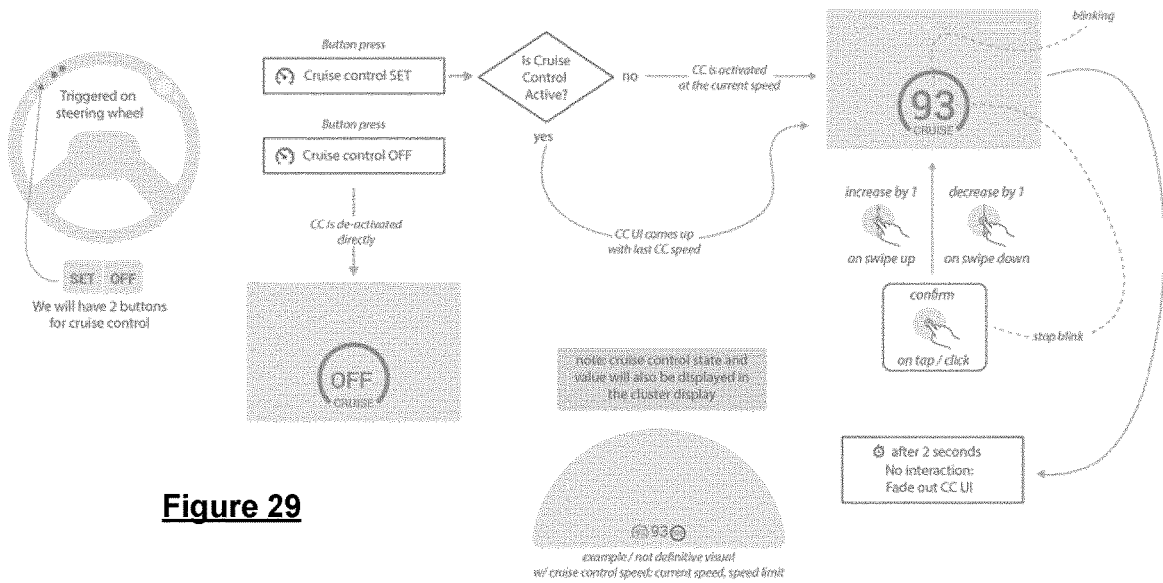
FIG. 29 shows an exemplary process for controlling the cruise control within the vehicle.

As discussed above, the steering wheel of the system can include one or more sets of buttons, in addition to a touch pad. These buttons can be used to provide a shortcut to quickly access certain functionality within the vehicle, such as opening volume control (shown in more detail in FIG. 28), setting and/or deactivating cruise control (shown in more detail in FIG. 29), opening voice or ASR control (such that the system does not need to continuously monitor the audio in the vehicle for voice instructions, but only does so after the associated button is depressed), etc. As shown in FIGS. 28 and 29, the driver can use the touch pad on the steering wheel to change the volume and set the cruising speed of the vehicle, respectively.

Figure 30A:
FIGS. 30A, 30B and 30C illustrate exemplary information that can be displayed on the heads up display (HUD), such as navigation instructions and vehicle warnings.
Figure 30B:
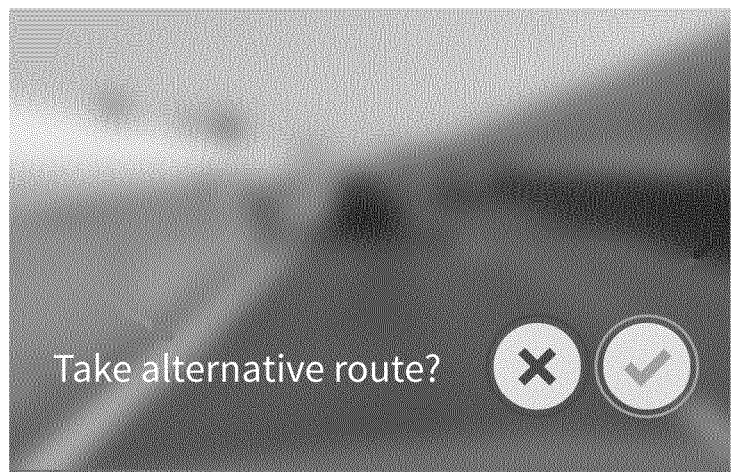
Figure 30C:
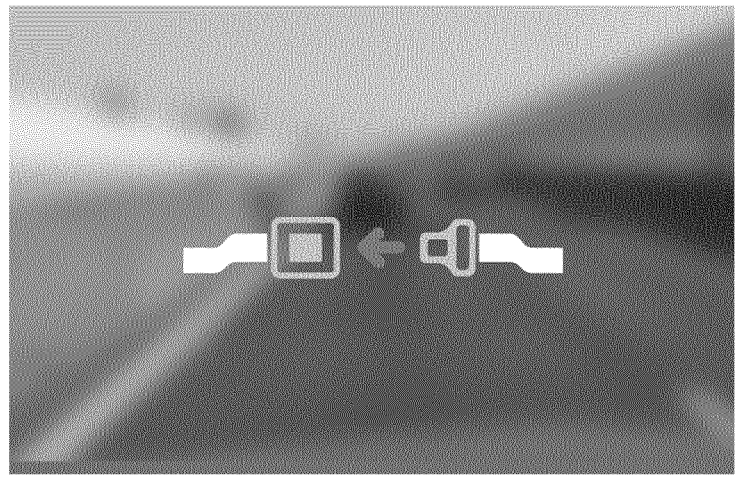

Finally, FIGS. 30A, 30B and 30C illustrate exemplary information that can be displayed on the HUD.

FIG. 30A shows an exemplary navigation instruction in relation to a predetermined route that can be displayed on the HUD, and which includes one or more of: a visual instruction (e.g. using arrows), a text instruction, and a distance (indicating the distance to the location at which the instructed manoeuvre needs to be performed). In the specific example of FIG. 30A, the driver is being instructed to exit to "Centrum" in 300 metres.

FIG. 30B shows an exemplary navigation enquiry that can be displayed on the HUD. In this example, the driver is being asked to confirm whether they would like to take an alternative route to a destination. The driver can select "yes" (the tick icon) or "no" (the cross icon), for example, using the touch pad on the steering wheel, e.g. by swiping and taping. A similar display can be presented to the driver whenever a positive or negative response is required, such as answering or declining an incoming telephone call.

FIG. 30C shows an exemplary warning that can be displayed on the HUD; in this case a warning that a seat belt in the vehicle is currently unfastened.

Any of the methods in accordance with the present invention may be implemented at least partially using software e.g. computer programs. The present invention thus also extends to a computer program comprising computer readable instructions executable to perform, or to cause a navigation device to perform, a method according to any of the aspects or embodiments of the invention. Thus, the invention encompasses a computer program product that, when executed by one or more processors, cause the one or more processors to generate suitable images (or other graphical information) for display on a display screen. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

The invention claimed is:

1. A method of operating a controller of a vehicle human machine interface, comprising:
   providing first output control signals configured to cause a vehicular head up display to present first content to a vehicle operator, wherein the first content comprises discontinuous content that is displayed only with the occurrence of a predetermined event;
   providing second output control signals configured to cause a vehicular digital cluster display to present second content to the vehicle operator, wherein said second content comprises continuous content providing time evolving feedback relating to on-going processes instigated and/or controlled by a vehicle operator;
   after a predetermined period of time or upon receipt of an input from the vehicle operator, changing at least some first content to second content, thereby moving content from the vehicular head up display to the digital cluster display; and
   upon receipt of an input from the vehicle operator that requests moving a user-selected notification bar that includes information informing at least the vehicle operator of an action to be taken for one or more incoming messages and/or phone calls from the digital cluster display to the head up display, moving the user-selected notification bar from the digital cluster display to the head up display where the user-selected notification bar is presented as first content.

2. The method of claim 1, wherein at least a warning portion of the first content is presented in the vehicular head up display only while a vehicular warning condition is satisfied.

3. The method of claim 1, wherein at least a notification portion of the first content is presented in the vehicular head up display temporarily after a vehicular notification condition is satisfied.

4. The method of claim 3, wherein the notification portion is displayed in the vehicular digital cluster display, after temporary display in the vehicular head up display, while the vehicular notification condition is satisfied.

5. The method of claim 1, comprising providing output control signals configured to cause on-going presentation of speed information in the digital cluster display and to cause, in response to a detection event, temporary presentation of speed information at the vehicular head up display.

6. The method of claim 1, comprising providing output control signals configured to cause on-going presentation of navigation guidance information in the digital cluster display and to cause, in response to a detection event, temporary presentation of navigation guidance information at the vehicular head up display.

7. The method claim 1, wherein the first content defines a vehicle operator navigable menu.

8. The method of claim 1, further comprising enabling passenger interaction via one or more wireless client devices.

9. The method of claim 1, further comprising:
selecting a priority display from a group of displays including at least the vehicular head up display and the vehicular digital cluster display;
processing input control signals from a touch sensitive steering wheel as input control signals associated with the selected priority display; and
providing output control signals configured to control the selected priority display to present content to the vehicle operator responsive to the input control signals.

10. The method of claim 9, comprising:
eye tracking or gaze detecting of a vehicle operator; and
selecting the priority display in dependence upon the eye tracking or gaze detecting of the vehicle operator.

11. The method of claim 1, further comprising:
providing output control signals configured to cause the vehicular digital cluster display to present a representation of a map to the vehicle operator;
processing first input control signals from a touch sensitive steering wheel to scroll the map displayed in the digital cluster display relative to a selector having a fixed location;
processing second input control signals from the touch sensitive steering wheel to select the location on the map represented by the selector; and
providing output control signals configured to cause the vehicular head up display to present information associated with the selected location to the vehicle operator.

12. A vehicular human machine interface (HMI), comprising:
a digital cluster display in a dashboard in front of a vehicle operator's position;
a head up display above the dashboard on a windshield in front of the vehicle operator's position; and
an apparatus for controlling the vehicle human machine interface comprising at least one processor and a memory coupled to the at least one processor, wherein the at least one processor is arranged to:
provide first output control signals configured to cause the head up display to present first content to the vehicle operator, wherein the first content comprises discontinuous content that is displayed only with the occurrence of a predetermined event;
provide second output control signals configured to cause the digital cluster display to present second content to the vehicle operator, wherein said second content comprises continuous content providing time evolving feedback relating to on-going processes instigated and/or controlled by a vehicle operator;
change, after a predetermined period of time or upon receipt of an input from the vehicle operator, at least some first content to second content, thereby moving content from the head up display to the digital cluster display; and
upon receipt of an input from the vehicle operator that requests moving a user-selected notification bar that includes information informing at least the vehicle operator of an action to be taken for one or more incoming messages and/or phone calls from the digital cluster display to the head up display, moving the user-selected notification bar from the digital cluster display to the head up display where the user-selected notification bar is presented as first content.

13. A vehicular human machine interface (HMI), comprising:
a touch sensitive steering wheel;
a digital cluster display in a dashboard in front of a vehicle operator's position;
a head up display above the dashboard on a windshield in front of the vehicle operator's position; and
an apparatus for controlling the vehicle human machine interface comprising at least one processor and a memory coupled to the at least one processor, wherein the at least one processor is arranged to:
provide first output control signals configured to cause the digital cluster display to present first content to the vehicle operator, wherein the first content comprises a representation of a map;
process first input control signals from the steering wheel to scroll the map displayed in the digital cluster display relative to a selector having a fixed location;
process second input control signals from the steering wheel to select the location on the map represented by the selector; and
provide second output control signals configured to cause the head up display to present second content to the vehicle operator, wherein the second content comprises information associated with the selected location.

14. The vehicular HMI of claim 12, further comprising one or more client devices configured to communicate with the apparatus.

15. A non-transitory computer readable medium comprising instructions which, when executed by one or more processors of an apparatus of a vehicular human machine interface, cause the apparatus to perform the method of claim 1.

16. The vehicular HMI of claim 13, further comprising one or more client devices configured to communicate with the apparatus.

17. A non-transitory computer readable medium comprising instructions which, when executed by one or more processors of an apparatus of a vehicular human machine interface that comprises a touch sensitive steering wheel, a digital cluster display in a dashboard in front of a vehicle operator's position, a head up display above the dashboard on a windshield in front of the vehicle operator's position, cause the apparatus to perform a method comprising:

provising first output control signals configured to cause the digital cluster display to present first content to the vehicle operator, wherein the first content comprises a representation of a map;

processing first input control signals from the steering wheel to scroll the map displayed in the digital cluster display relative to a selector having a fixed location;

processing second input control signals from the steering wheel to select the location on the map represented by the selector; and providing second output control signals configured to cause the head up display to present second content to the vehicle operator, wherein the second content comprises information associated with the selected location.

* * * * *